US011913398B2

(12) United States Patent
Ogawa et al.

(10) Patent No.: US 11,913,398 B2
(45) Date of Patent: Feb. 27, 2024

(54) ENGINE CONTROL DEVICE, AND ENGINE CONTROL METHOD

(71) Applicant: TRANSTRON INC., Yokohama (JP)

(72) Inventors: Masatoshi Ogawa, Yokohama (JP); Takuma Degawa, Yokohama (JP)

(73) Assignee: TRANSTRON INC., Yokohama (JP)

( * ) Notice: Subject to any disclaimer, the term of this patent is extended or adjusted under 35 U.S.C. 154(b) by 0 days.

(21) Appl. No.: 17/949,531

(22) Filed: Sep. 21, 2022

(65) Prior Publication Data

US 2023/0126014 A1 Apr. 27, 2023

(30) Foreign Application Priority Data

Oct. 22, 2021 (JP) ................................ 2021-173487

(51) Int. Cl.
*F02D 41/14* (2006.01)
*F02D 41/24* (2006.01)

(52) U.S. Cl.
CPC ..... *F02D 41/1406* (2013.01); *F02D 41/1405* (2013.01); *F02D 41/2422* (2013.01); *F02D 41/2467* (2013.01); *F02D 41/2487* (2013.01); *F02D 2041/1434* (2013.01); *F02D 2200/0616* (2013.01)

(58) Field of Classification Search
CPC ............. F02D 41/1405; F02D 41/1406; F02D 41/2422; F02D 41/2467; F02D 41/2487; F02D 2041/1434; F02D 2200/0616
See application file for complete search history.

(56) References Cited

U.S. PATENT DOCUMENTS 11,149,677 B1 * 10/2021 Charbonnel ........ F02D 41/0087
11,459,962 B2 * 10/2022 Sudarsan .............. F02D 41/248
2005/0039721 A1 2/2005 Truscott et al.
(Continued)

FOREIGN PATENT DOCUMENTS

DE 102014116128 A1 * 5/2016 ........... F02D 35/023
JP 2003-328851 A 11/2003
(Continued)

OTHER PUBLICATIONS

European Search Report dated Mar. 29, 2023, in European Application No. EP 22 19 5571.

*Primary Examiner* — Hung Q Nguyen
*Assistant Examiner* — Mark L. Greene
(74) *Attorney, Agent, or Firm* — STAAS & HALSEY LLP

(57) ABSTRACT

An engine control device includes a model that, based on engine operating condition and first-type operation amount, reproduces at least one index from among various indexes of combustion state of engine, and a processor that executes a process including deciding on second-type operation amount, by optimization using the model so as to treat at least one of the indexes, which are reproduced by the model, as estimated value of control amount, and ensure that the estimated value of the control amount follows control target value, associating the second-type operation amount with the control target value and the engine operating condition, rewriting a learning control table in which operation amount corresponding to the control target value and the engine operating condition is registered, and calculating operation amount according to the learning control table based on the control target value and the engine operating condition.

16 Claims, 14 Drawing Sheets

(56) References Cited

U.S. PATENT DOCUMENTS

| | | | |
|---|---|---|---|
| 2005/0187700 | A1 | 8/2005 | Jacobson |
| 2009/0259385 | A1 | 10/2009 | Loeffler et al. |
| 2011/0106398 | A1 | 5/2011 | Ikeda et al. |
| 2011/0264353 | A1 | 10/2011 | Atkinson et al. |
| 2016/0025028 | A1 | 1/2016 | Vaughan |

FOREIGN PATENT DOCUMENTS

| | | | | |
|---|---|---|---|---|
| JP | 2009-79594 | A | 4/2009 | |
| WO | WO 02/095191 | A2 | 11/2002 | |
| WO | WO 2008/045776 | A1 | 4/2008 | |
| WO | WO-2020216470 | A1 * | 10/2020 | ............. F02D 41/02 |

* cited by examiner

ENGINE CONTROL DEVICE, AND ENGINE CONTROL METHOD

CROSS-REFERENCE TO RELATED APPLICATION(S)

This application is based upon and claims the benefit of priority of the prior Japanese Patent Application No. 2021-173487, filed on Oct. 22, 2021, the entire contents of which are incorporated herein by reference.

FIELD

The embodiments discussed herein are related to an engine control device, and an engine control method.

BACKGROUND

As far as the control of an automotive engine is concerned, efforts for achieving sophisticated control are being made by reproducing the combustion phenomenon of the engine using deep learning which is a kind of artificial intelligence (AI).

However, during the control performed using a combustion model for engines that is reproduced according to deep learning which is a kind of AI, using a model such as a multi-layer neural network (NN) that indicates multi-input multi-output of engine combustion, optimized control is performed for simultaneously controlling a large number of control amounts on the basis of a large number of operation amounts. Hence, in the control performed using a combustion model for engines that is reproduced according to deep learning which is a kind of AI, a large amount of arithmetic processing time is spent.

Moreover, because the impact of the amount of air flowing into the engine cylinder as well as the impact of the temperature and the pressure of the air is taken into account, the combustion model for engines is nonlinear in nature and is expressed as a dynamic system having properties such as the first-order lag, the second-order lag, and the dead time. Hence, in a combustion model for engines, deriving a mathematical model of inverse functions according to formula manipulation is a difficult task. That makes it difficult to solve the problem in an analytical manner, and the calculation load increases. Hence, it is a difficult task to install a combustion model for engines in an engine control unit, and to perform on-board control of the execution time.

SUMMARY

According to an aspect of an embodiment, an engine control device includes a model that, based on engine operating condition and first-type operation amount, reproduces at least one index from among indexes of combustion state of engine, namely, thermal efficiency, maximum pressure rise rate inside cylinder, torque, combustion start position, combustion gravity center, NOx, soot, CO, HC, and PM, and a processor that executes a process including deciding on second-type operation amount, by optimization using the model so as to treat at least one of the indexes, which are reproduced by the model, as estimated value of control amount, and ensure that the estimated value of the control amount follows control target value, associating the second-type operation amount with the control target value and the engine operating condition, rewriting a learning control table in which operation amount corresponding to the control target value and the engine operating condition is registered, and calculating operation amount according to the learning control table based on the control target value and the engine operating condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. However, the engine control device, and the engine control method according to the application concerned are not limited by the embodiments described below. Moreover, the embodiments can be appropriately combined without causing contradictions.

[a] First Embodiment

Example of Overall Configuration

Figure 1:
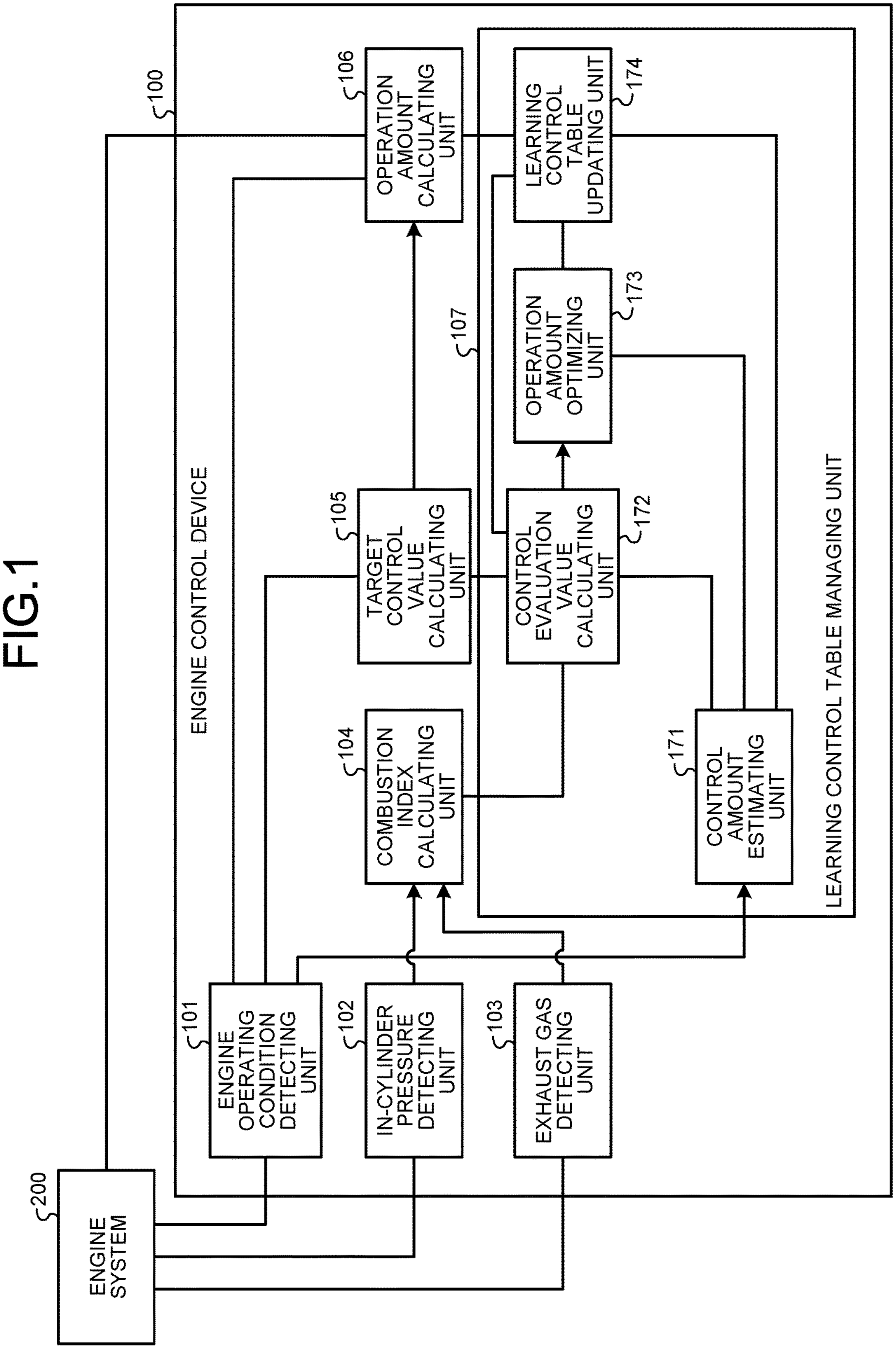
FIG. 1 is a configuration of an engine control device according to a first embodiment.

Explained below with reference to FIG. 1 is a configuration of an engine control device according to a first embodiment. FIG. 1 is a block diagram of the engine control device according to the first embodiment. As illustrated in FIG. 1, an engine control device 100 is connected to an engine system 200 that represents the control target. The engine control device 100 and the engine system 200 perform communication with each other.

In the engine control device 100, an AI model that is an engine combustion model configured with a multi-layer neural network is used for performing optimized control of the engine system 200 while calculating the optimum operation amount at a fast rate. Given below is the detailed explanation of the engine control device 100.

As illustrated in FIG. 1, the engine control device 100 includes an engine operating condition detecting unit 101, an in-cylinder pressure detecting unit 102, an exhaust gas detecting unit 103, a combustion index calculating unit 104, a control target value calculating unit 105, an operation amount calculating unit 106, and a learning control table managing unit 107.

The engine operating condition detecting unit 101 obtains, from the engine system 200, the engine operating conditions including the engine rotation count and the total combustion injection quantity. Moreover, the engine operating condition detecting unit 101 obtains, from the engine system 200, the state quantities including the air excess ratio, the fuel injection pressure, the intake manifold pressure, and the intake manifold oxygen concentration. Then, the engine operating condition detecting unit 101 outputs the information about the engine operating conditions of the engine system 200 to the control target value calculating unit 105. Moreover, the engine operating condition detecting unit 101 outputs the information about the engine operating conditions and the state quantities to the operation amount calculating unit 106 and the learning control table managing unit 107.

The in-cylinder pressure detecting unit 102 obtains the information about the in-cylinder pressure that is detected by an in-cylinder pressure sensor (not illustrated) installed in the engine system 200. Then, the in-cylinder pressure detecting unit 102 outputs he information about the in-cylinder pressure to the combustion index calculating unit 104.

The exhaust gas detecting unit 103 obtains the information about the exhaust gases, such as nitrogen oxide (NOx), soot, carbon monoxide (CO), hydrocarbon (HC), and particulate matter (PM) as detected by an exhaust gas sensor (not illustrated) that is installed in the engine system 200. Then, the exhaust gas detecting unit 103 outputs the information about the exhaust gases to the combustion index calculating unit 104.

The combustion index calculating unit 104 receives input of the information about the in-cylinder pressure from the in-cylinder pressure detecting unit 102. Moreover, the combustion index calculating unit 104 receives input of the information about the exhaust gases from the exhaust gas detecting unit 103. Then, from the obtained in-cylinder pressure, the combustion index calculating unit 104 calculates the thermal efficiency, the maximum pressure rise rate inside the cylinder, the torque, the combustion start position, and the combustion gravity center. Subsequently, the combustion index calculating unit 104 clubs the information about the thermal efficiency, the maximum pressure rise rate inside the cylinder, the torque, the combustion start position, and the combustion gravity center with the information about the exhaust gases such as NOx, soot, CO, HC, and PM; and treats the clubbed information as indexes of the combustion state of the engine. In the following explanation, the indexes representing the combustion state of the engine are called engine combustion indexes. Then, the combustion index calculating unit 104 outputs the engine combustion indexes to the learning control table managing unit 107.

The control target value calculating unit 105 receives input of the information about the engine operating conditions from the engine operating condition detecting unit 101. Then, the control target value calculating unit 105 calculates control target values from the engine rotation count and the total fuel injection quantity that represent the engine operating conditions. Then, the control target value calculating unit 105 outputs the calculated control target values to the operation amount calculating unit 106 and the learning control table managing unit 107.

The operation amount calculating unit 106 receives input of the engine operating conditions and the state quantities of the engine system 200 from the engine operating condition detecting unit 101. Moreover, the operation amount calculating unit 106 receives input of the control target values from the control target value calculating unit 105. Furthermore, the operation amount calculating unit 106 obtains a learning control table from the learning control table managing unit 107. In the learning control table, combinations of the control target values with of one or more items from among the state quantities and the engine operating conditions are registered along with the corresponding appropriate operation amounts. That is, using the learning control table, from a combination of the control target values with one or more items from among the state quantities and the engine operating conditions; the operation amount corresponding to that combination can be obtained. In this way, the learning control table has a structure that enables rewriting of a table which reproduces the input-output responses of an inverse model of an AI model (explained later).

Subsequently, based on one or more of the engine operating conditions and the state quantities of the engine system and based on the control target values, the operation amount calculating unit 106 refers to the learning control table and obtains operation amounts including the fuel injection quantity and the injection period during each stage of multiple injection, such as pre-injection, pilot injection, main injection and after-injection. Then, the operation amount calculating unit 106 notifies the engine system 200 about the obtained operation amount, and controls the engine system 200 to operate according to the obtained operation amounts.

Figure 2:
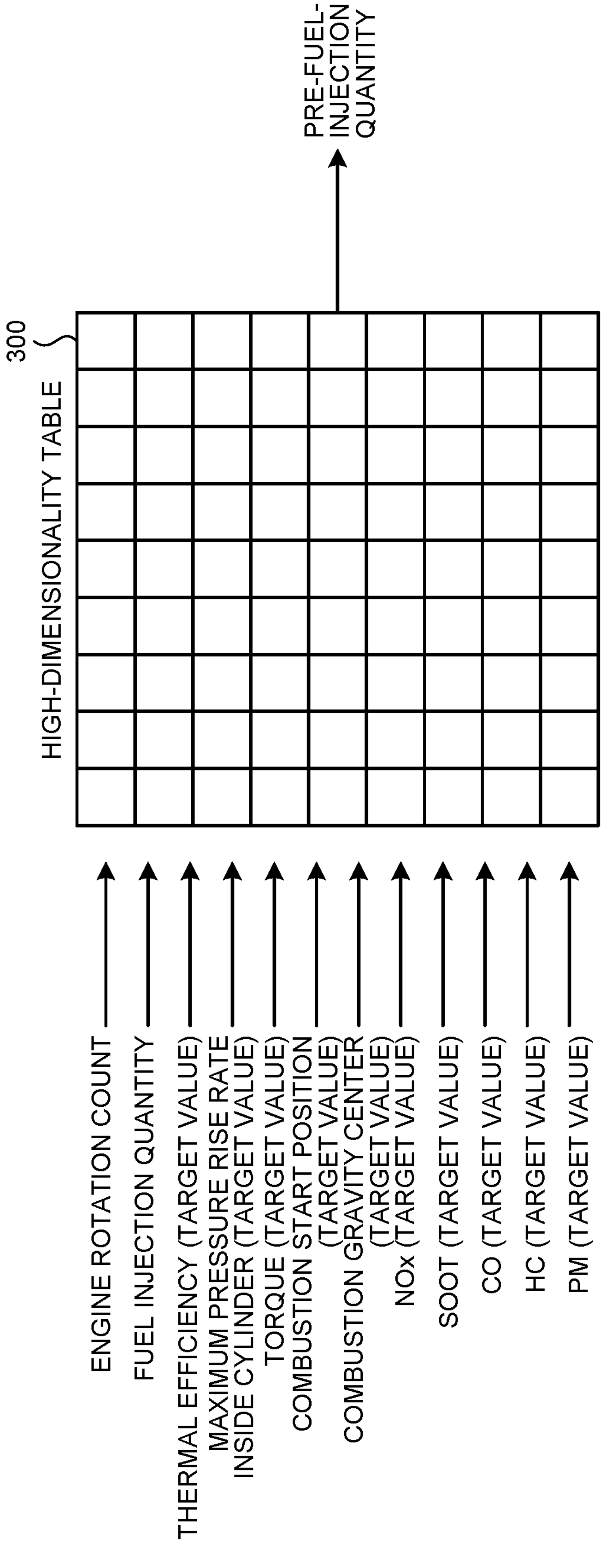
FIG. 2 is a diagram illustrating an example of operation amount calculation when a learning control table representing a high-dimensionality table is used.

FIG. 2 is a diagram illustrating an example of operation amount calculation when the learning control table representing a high-dimensionality table is used. For example, the operation amount calculating unit 106 includes a learning control table 300 illustrated in FIG. 2. Using the learning control table 300, the operation amount calculating unit 106 can receive input of the engine operating conditions and input of the values of three or more items from among the state quantities and the control target values; and can obtain an operation amount called a pre-fuel-injection quantity representing one of the operation amounts with respect to that input. In that case, in order to obtain a plurality of operation amounts, the operation amount calculating unit 106 either can have a plurality of multi-input single-output tables such as the learning control tables 300 provided therein, or can use a multi-input multi-output table.

Figure 3:
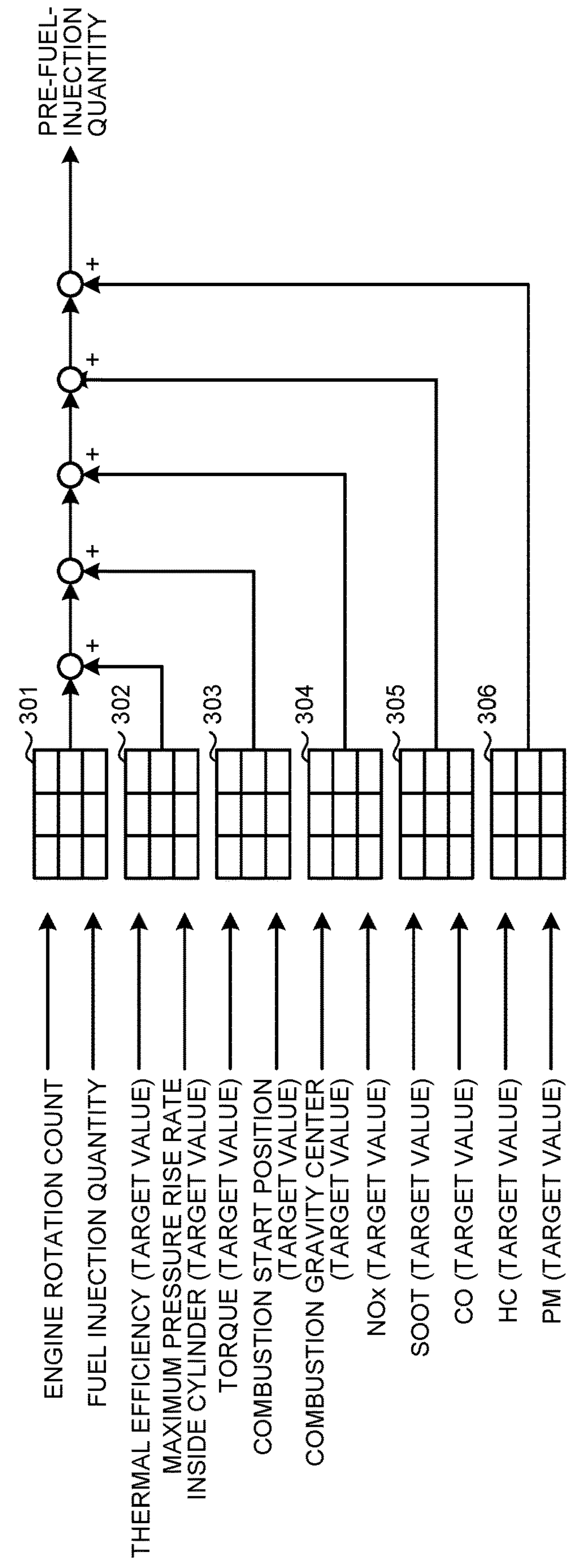
FIG. 3 is a diagram illustrating an example of operation amount calculation when learning control tables representing two-dimensional tables are used.

FIG. 3 is a diagram illustrating an example of operation amount calculation when learning control tables representing two-dimensional tables are used. For example, the operation amount calculating unit 106 includes learning control tables 301 to 306 that are two-dimensional tables as illustrated in FIG. 3. Then, the operation amount calculating unit 106 can combine, in multiple stages, the output from each of the learning control tables 301 to 306 that corresponds to two values from among the engine operating conditions, the state quantities, and the control target values; and can obtain the pre-fuel-injection quantity representing one of the operation amounts. Moreover, in an identical manner to obtaining the pre-fuel-injection quantity, the operation amount calculating unit 106 can combine the learning control tables 301 to 306 representing two-dimensional tables, and obtain other operation amounts such as the injection quantity and the injection period.

The learning control table managing unit 107 updates the combinations of the control target values with one or more items from among the engine operating conditions and the state quantities, and updates the learning control table in which the values of the operation amounts corresponding to the combinations are registered. Herein, the learning control table managing unit 107 updates the learning control table on a periodic basis or at predetermined timings such as when predetermined conditions are satisfied. Moreover, the learning control table managing unit 107 updates the learning control table in an independent manner from the calculation of the operation amounts as performed by the operation amount calculating unit 106 using the learning control table. That is, the learning control table managing unit 107 sends the updated learning control table to the operation amount calculating unit 106. Thereafter, until the learning control table is updated again, the operation amount calculating unit 106 uses the available updated learning control table in calculating the operation amounts. As illustrated in FIG. 1, the learning control table managing unit 107 includes a control amount estimating unit 171, a control evaluation value calculating unit 172, an operation amount optimizing unit 173, and a learning control table updating unit 174.

The control amount estimating unit 171 holds an AI model that represents a mathematical model of the engine system 200. As the AI model, it is possible to use a neural network such as a deep neural network (DNN), a recurrent neural network (RNN), or a long short term memory (LSTM).

Figure 4:
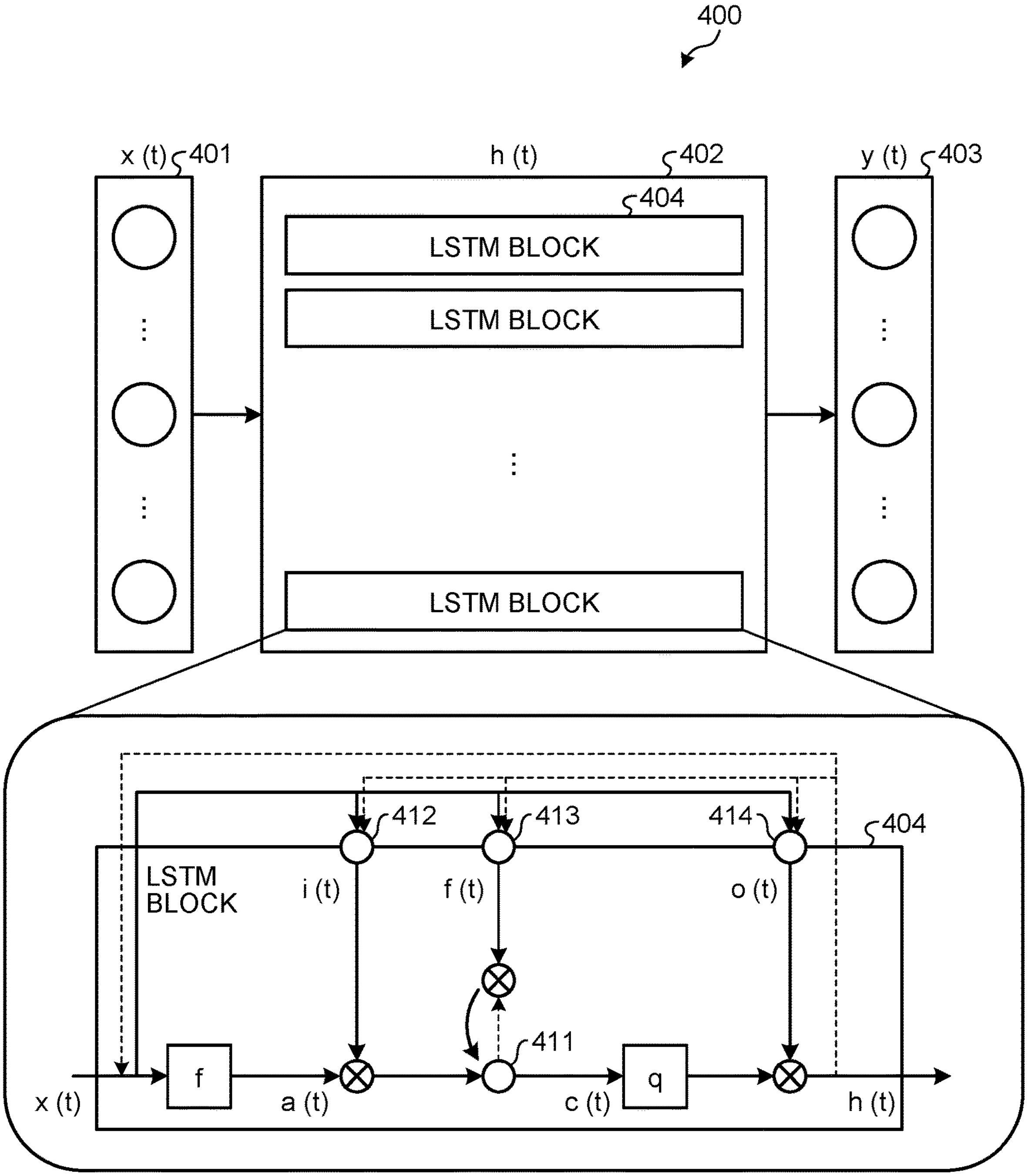
FIG. 4 is a diagram illustrating an example of an AI model that represents a mathematical model of an engine system.

For example, the control amount estimating unit 171 includes an AI model 400 that is an LSTM model as illustrated in FIG. 4. FIG. 4 is a diagram illustrating an example of the AI model that represents a mathematical model of the engine system. As illustrated in FIG. 4, the AI model 400 includes an input layer 401, a hidden layer 402, and an output layer 403. The LSTM model has a structure obtained when the units in the hidden layer of an RNN, which is a type of a deep learning model, are replaced by LSTM blocks 404. Each LSTM block 404 includes a memory cell 411 used for storing the state, and includes three gates 412 to 414. The LSTM blocks 404 are capable of handling long-term time dependency as well as short-term time dependency.

The parameters in the LSTM model illustrated in FIG. 4 are calculated using Equations (1) to (6) given below.

$$c(t)=i(t)\odot\alpha(t)+f(t)\odot c(t-1) \tag{1}$$

$$i(t)=\sigma(\hat{\iota}(t))=\sigma(W_i x(t)+U_i h(t-1)+b_i) \tag{2}$$

$$o(t)=\sigma(\hat{o}(t))=\sigma(W_o x(t)+U_o h(t-1)+b_o) \tag{3}$$

$$f(t)=\sigma(\hat{f}(t))=\sigma(W_f x(t)+U_f h(t-1)+b_f) \tag{4}$$

$$a(t)=f(\hat{a}(t))=f(W_a x(t)+U_a h(t-1)+b_a) \tag{5}$$

$$h(t)=o(t)\odot g(c(t)) \tag{6}$$

Herein, "s" represents a sigmoid function; "b" represents the bias; "W" represents the input weight; "U" represents the regression weight; and "f" and "g" represent hyperbolic tangent functions (tanh).

The AI model included in the control amount estimating unit 171 treats the engine operating conditions, the state quantities, and the operation amounts as input; and estimates and outputs, as control amounts, information serving as the indexes of the combustion state of the engine. As the information serving as the indexes of the combustion state of the engine, for example, it is possible to use the following information either individually or in combination: the thermal efficiency, the maximum pressure rise rate inside the cylinder, the torque, the combustion start position, the combustion gravity center, and the information about the exhaust gases. The information about the exhaust gases can be about one or more of NOx, soot, CO, HC, and PM. That is, based on the engine operating conditions and a first-type operation amount, the AI model reproduces at least one of the thermal efficiency, the maximum pressure rise rate inside the cylinder, the torque, the combustion start position, the combustion gravity center, NOx, soot, CO, HC, and PM that are included in the engine combustion indexes.

The control amount estimating unit 171 obtains the engine operating conditions and the state quantities of the engine system 200 from the engine operating condition detecting unit 101. Moreover, from the operation amount optimizing unit 173, the control amount estimating unit 171 obtains the first-type operation amount being subjected to optimization calculation.

Then, to the AI model held therein, the control amount estimating unit 171 inputs the engine operating conditions and the state quantities of the engine system 200 and inputs the first-type operation amount of the operation amount optimizing unit 173; and estimates a control amount representing an index of the combustion state of the engine. Herein, the control amount represents at least one of the engine combustion indexes reproduced in the AI model. Then, the control amount estimating unit 171 outputs the estimated value of the control amount to the control evaluation value calculating unit 172. Moreover, the control amount estimating unit 171 outputs, to the learning control table updating unit 174, the information about the engine operating conditions and the state quantities of the engine system 200 that were used in estimating the control amount.

The control evaluation value calculating unit 172 obtains the control target values from the control target value calculating unit 105. Moreover, the control evaluation value calculating unit 172 obtains the estimated value of the control amount as estimated by the control amount estimating unit 171. Furthermore, the control evaluation value calculating unit 172 obtains the first-type operation amount from the operation amount optimizing unit 173. Moreover, the control evaluation value calculating unit 172 obtains the engine combustion indexes generated by the combustion index calculating unit 104.

Then, in order to take into account the drift that is attributed to the modeling error of the AI model, which estimates the control amount, or attributed to the sensor deterioration; the control evaluation value calculating unit 172 obtains the actual value of the control amount from the engine combustion indexes. Then, the control evaluation value calculating unit 172 adds the actual value of the control amount to the estimated control amount, and calculates the control amount after taking into account the drift attributed to the modeling error or the sensor deterioration.

Figure 5:
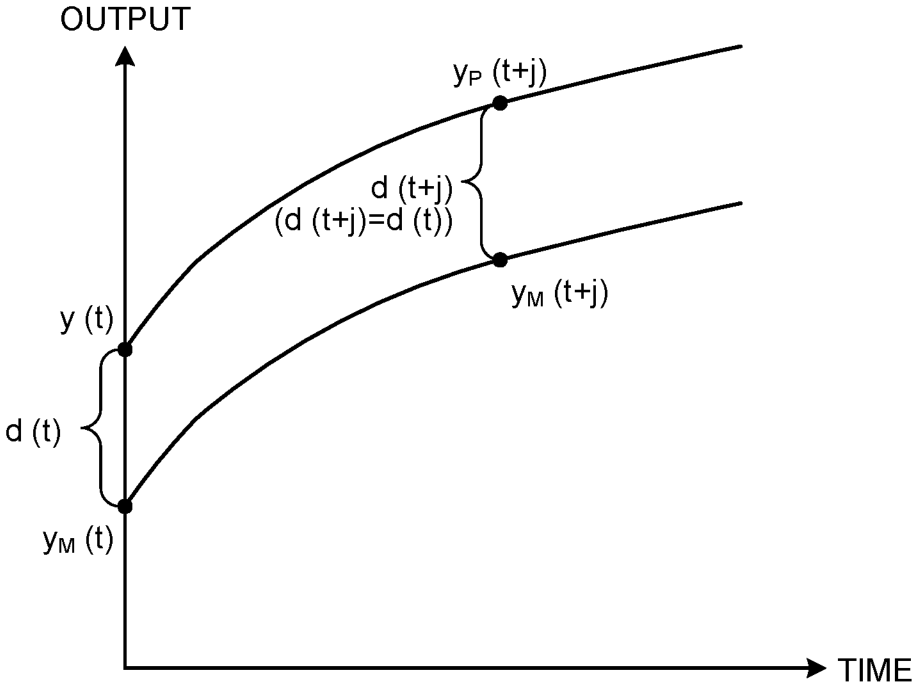
FIG. 5 is a diagram for explaining an example of taking into account the drift that is attributed to the modeling error of the AI model or attributed to the sensor deterioration.

FIG. 5 is a diagram for explaining an example of taking into account the drift that is attributed to the modeling error of the AI model or attributed to the sensor deterioration. In FIG. 5, the vertical axis represents the output, and the horizontal axis represents the passage of time. Herein, in order to take into account the impact of the mismatch between the estimated value obtained by the AI model and the actual measured value and the impact of the disturbance and the sensor deterioration, the control evaluation value calculating unit 172 estimates the control amount by, for example, considering the error between the current estimated value of the control amount and the current measured value in the relationship illustrated in FIG. 5.

With reference to FIG. 5, the explanation is given about the case in which y(t) represents the current actual measured value; $y_M(t+j)$ represents the estimation value ahead by "j" number of steps; and $y_M(t)$ represents the current estimated value of the model. An estimated value $y_p(t+j)$ of the control amount is expressed as $y_p(t+j)=y(t)+y_M(t+j)-y_M(t)$. In that case, $y_p=[y_p(t+L), \ldots, y_p(t+L+P-1)]^t$ holds true, and the estimation performed in the AI model can be said to be the same as simply predicting the variation without taking into account an error d(t). In that regard, the control evaluation value calculating unit 172 treats, as the estimated value, the value obtained by adding, to the estimated value of the control amount that is predicted, the error between the estimated value and the measured value of the control amount at a specific point of time.

Then, the control evaluation value calculating unit 172 calculates a control evaluation value using the error between the control target value and the control amount and using the value obtained by weighting the variation in the operation amount. For example, the control evaluation value calculating unit 172 calculates, as a control evaluation value, the value obtained by adding the time average value of the error between the control target value and the control amount during a predetermined period of time and the time-averaged value of the variation in the operation amount during a predetermined period of time. Then, the control evaluation value calculating unit 172 outputs the calculated control evaluation value to the operation amount optimizing unit 173. Moreover, the control evaluation value calculating unit 172 outputs the control target value, which was used in calculating the control evaluation value, to the learning control table updating unit 174.

The operation amount optimizing unit 173 receives input of the control evaluation value from the control evaluation value calculating unit 172. Then, the operation amount optimizing unit 173 calculates the operation amount for which the control evaluation value is the smallest. In the optimization calculation, the operation amount optimizing unit 173 outputs the calculated operation amount as the first-type operation amount to the control amount estimating unit 171. Moreover, at the time of ending the optimization calculation when the control evaluation value is the smallest or when a predetermined number of iterations are completed, the operation amount optimizing unit 173 treats the calculated operation amount as a second-type operation amount, and outputs it as the optimum operation amount to the learning control table updating unit 174.

The learning control table updating unit 174 receives input of the optimum operation amounts from the operation amount optimizing unit 173. Moreover, the learning control table updating unit 174 receives input of the engine operating conditions and the state quantities of the engine system 200 from the control amount estimating unit 171. Furthermore, the learning control table updating unit 174 receives input of the control target values from the control evaluation value calculating unit 172.

Subsequently, the learning control table updating unit 174 associates the combinations of the control target values, the engine operating conditions, and the state quantities with the corresponding optimum operation amounts. Then, the learning control table updating unit 174 rewrites the learning control table with the combinations of the control target values, the engine operating conditions, and the state quantities and with the corresponding optimum operation amounts. Subsequently, the learning control table updating unit 174 outputs the updated learning control table to the operation amount calculating unit 106.

In the first embodiment, the learning control table updating unit 174 rewrites the information of the learning control table that is used for reproducing the input-output responses of the inverse model of the AI model, and thus updates the learning control table. However, it is also possible to have a different configuration. For example, the following two tables are provided as the learning control tables. As the first table, a first-type learning control table is provided in which the combinations of the control target values with one or more items from among the state quantities and the engine operating conditions are registered along with the corresponding appropriate operation amounts. As the second table, a second-type learning control table is provided for the purpose of correcting the difference between the operation amounts registered in the first-type learning control table and the operation amounts calculated by performing optimization using the AI model. Then, the learning control table updating unit 174 can update the second-type learning control table in such a way that the differences between the operation amounts registered in the first-type learning table and the optimum operation amounts obtained by the operation amount optimizing unit 173 is corrected, and can send the first-type learning control table and the second-type learning control table to the operation amount calculating unit 106. In that case, the operation amount calculating unit 106 can use the second-type learning control table to correct the operation amounts calculated using the first-type learning control table, and can control the engine system 200 using the corrected operation amounts.

Flow of Operations

Figure 6:
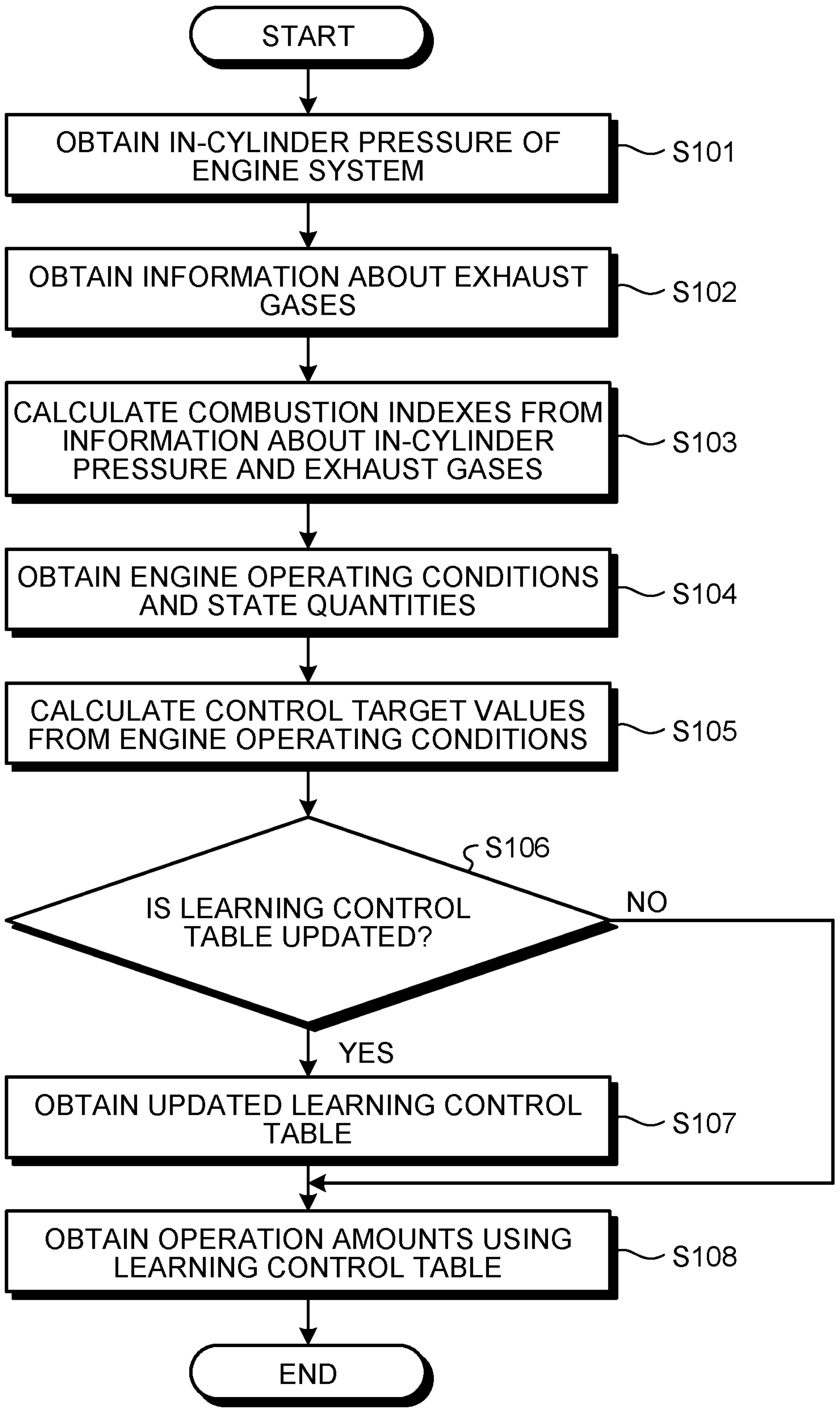
FIG. 6 is a flowchart for explaining a control operation with respect to the engine system as performed by the engine control device according to the first embodiment.

FIG. 6 is a flowchart for explaining a control operation with respect to the engine system as performed by the engine control device according to the first embodiment. Thus, explained below with reference to FIG. 6 is the flow of the control operation with respect to the engine system 200 as performed by the engine control device 100 according to the first embodiment.

The in-cylinder pressure detecting unit 102 obtains the information about the in-cylinder pressure detected by the in-cylinder pressure sensor installed in the engine system 200 (Step S101). Then, the in-cylinder pressure detecting unit 102 outputs the information about the detected in-cylinder pressure to the combustion index calculating unit 104.

The exhaust gas detecting unit 103 obtains the information about the exhaust gases detected by the exhaust gas sensor installed in the engine system 200 (Step S102). Then, the exhaust gas detecting unit 103 outputs the information about the exhaust gases to the combustion index calculating unit 104.

The combustion index calculating unit 104 calculates the combustion indexes of the engine system 200 using the information about the in-cylinder pressure as obtained from the in-cylinder pressure detecting unit 102 and using the information about the exhaust gases as obtained from the exhaust gas detecting unit 103 (Step S103).

The engine operating condition detecting unit 101 obtains, from the engine system 200, the engine operating conditions including the engine rotation count and the total combustion injection quantity. Moreover, the engine operating condition detecting unit 101 obtains, from the engine system 200, the state quantities including the air excess ratio, the fuel injection pressure, the intake manifold pressure, and the intake manifold oxygen concentration (Step S104). Then, the engine operating condition detecting unit 101 outputs the information about the engine operating conditions to the control target value calculating unit 105.

The control target value calculating unit 105 receives input of the information about the engine operating conditions from the engine operating condition detecting unit 101. Then, the control target value calculating unit 105 calculates the control target values from the engine operating conditions (Step S105). Subsequently, the control target value calculating unit 105 outputs the calculated control target values to the operation amount calculating unit 106.

The learning control table updating unit 174 of the learning control table managing unit 107 determines whether or not the learning control table has been updated (Step S106). If the learning control table has not been updated (No at Step S106), then the system control of the engine system proceeds to Step S108.

On the other hand, if the learning control table has been updated (Yes at Step S106), then the learning control table updating unit 174 outputs the updated learning control table to the operation amount calculating unit 106. Thus, the operation amount calculating unit 106 obtains the updated learning control table (Step S107).

Subsequently, based on one or more items from among the engine operating conditions and the state quantities of the engine system 200 and based on the control target values; the operation amount calculating unit 106 obtains, using the learning control table, the operation amounts including the fuel injection quantity and the injection period at each stage of multiple injection, such as pre-injection, pilot injection, main injection, and after-injection (Step S108). Then, the operation amount calculating unit 106 notifies the engine system 200 about the obtained operation amounts, and controls the engine system 200 to operate according to the notified operation amounts.

Figure 7:
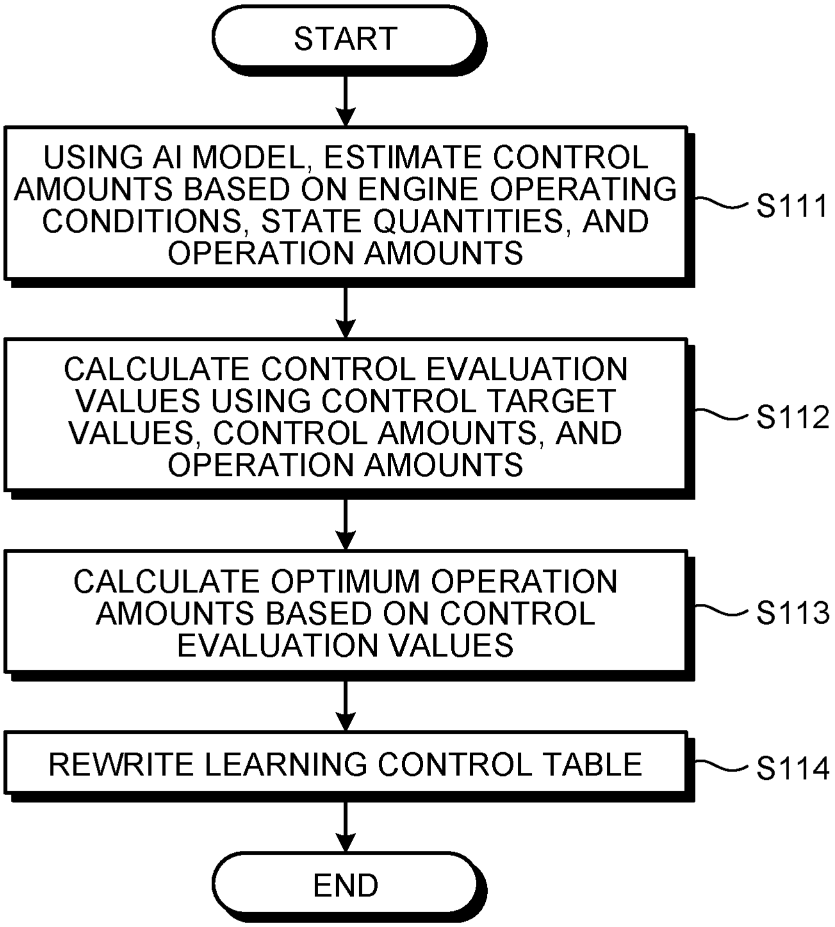
FIG. 7 is a flowchart for explaining an updating operation with respect to the learning control table as performed in the engine control device according to the first embodiment.

FIG. 7 is a flowchart for explaining an updating operation with respect to the learning control table as performed in the engine control device according to the first embodiment. Thus, explained below with reference to FIG. 7 is the flow of the updating operation with respect to the learning control table as performed in the engine control device 100 according to the first embodiment.

The control amount estimating unit 171 obtains the engine operating conditions and the state quantities of the engine system 200 from the engine operating condition detecting unit 101. Moreover, from the operation amount optimizing unit 173, the control amount estimating unit 171 obtains the first-type operation amount being subjected to optimization calculation. Then, the control amount estimating unit 171 inputs the engine operating conditions and the state quantities of the engine system 200 and inputs the first-type operation amount of the operation amount optimizing unit 173 to the AI model held therein, and estimates each control amount (Step S111). Subsequently, the control amount estimating unit 171 outputs the estimated control amount to the control evaluation value calculating unit 172. Moreover, the control amount estimating unit 171 outputs, to the learning control table updating unit 174, the information that is about the engine operating conditions and the state quantities of the engine system 200 and that was used in estimating the control amount.

The control evaluation value calculating unit 172 obtains the control target value from the control target value calculating unit 105. Moreover, the control evaluation value calculating unit 172 obtains the estimated control amount from the control amount estimating unit 171. Furthermore, the control evaluation value calculating unit 172 obtains the first-type operation amount from the operation amount optimizing unit 173. Moreover, the control evaluation value calculating unit 172 obtains the engine combustion indexes generated by the combustion index calculating unit 104. Furthermore, the control evaluation value calculating unit 172 obtains the actual value of the control amount from the engine combustion indexes. Then, the control evaluation value calculating unit 172 calculates the control amount by considering the actual value of the control amount along with the estimated control amount and by taking into account the drift. Subsequently, the control evaluation value calculating unit 172 calculates the control evaluation value using the error between the control target value and the control amount and using the value obtained by weighting the variation in the operation amount (Step S112). Subsequently, the control evaluation value calculating unit 172 outputs the calculated control evaluation value to the operation amount optimizing unit 173. Moreover, the control evaluation value calculating unit 172 outputs the control target value, which was used in calculating the control evaluation value, to the learning control table updating unit 174.

The operation amount optimizing unit 173 receives input of the control evaluation value from the control evaluation value calculating unit 172. Then, the operation amount optimizing unit 173 calculates the operation amount for which the control evaluation value is the smallest (Step S113). In the optimization calculation, the operation amount optimizing unit 173 outputs the calculated operation amount as the first-type operation amount to the control amount estimating unit 171. Furthermore, at the time of ending the optimization calculation when the control evaluation value is the smallest or when a predetermined number of iterations are completed, the operation amount optimizing unit 173 treats the calculated operation amount as the second-type operation amount, and outputs it as the optimum operation amount to the learning control table updating unit 174.

The learning control table updating unit 174 receives input of the optimum operation amounts from the operation amount optimizing unit 173. Moreover, the learning control table updating unit 174 receives input of the engine operating conditions and the state quantities of the engine system 200 from the control amount estimating unit 171. Furthermore, the learning control table updating unit 174 receives input of the control target values from the control evaluation value calculating unit 172. Then, the learning control table updating unit 174 associates the combinations of the control target values, the engine operating conditions, and the state quantities with the corresponding optimum operation amounts. Subsequently, the learning control table updating unit 174 rewrites the learning control table using the combinations of the control target values, the engine operating conditions, and the state quantities and using the corresponding operation amounts (Step S114).

As explained above, the engine control device 100 according to the first embodiment includes the learning control table managing unit 107 that holds an AI model which, based on the engine operating conditions and the state quantities and based on the first-type operation amount, reproduces at least one of the indexes of the engine combustion state, namely, the thermal efficiency, the maximum pressure rise rate inside the cylinder, the torque, the combustion start position, the combustion gravity center, NOx, soot, CO, HC, and PM. Then, the learning control table managing unit 107 treats at least one of the indexes, which are reproduced in the AI model, as the estimated value of the control amount; and decides on the second-type operation amount by performing optimization using the AI model in such a way that the estimated values of the control amounts follow the control target values. Moreover, the learning control table managing unit 107 associates the second-type operation amount and the control target values with the engine operation conditions and the state quantities, and rewrites the learning control table in which the control target values and the operation amounts corresponding to the engine operating conditions and the state quantities are registered. The engine control device 100 also includes the operation amount calculating unit 106 that, based on the control target values and based on the engine operating conditions and the state quantities, calculates the operation amounts using the learning control table.

Then, in the engine control device 100 according to the first embodiment, as a result of performing optimization using the AI model that estimates the control amounts representing the indexes of the combustion state, the optimum operation amounts corresponding to the combinations of the control target values, the engine operating conditions, and the state quantities are obtained. Subsequently, in the engine control device 100, the learning control table, in which the combinations of the control target values, the edge operating conditions, and the state quantities are registered along with the corresponding operation amounts, is updated with the optimum operation amounts at a predetermined timing. Moreover, in the engine control device 100, using the learning control table, the optimum operation amounts are obtained based on the current engine operating conditions, the current state quantities, and the current control target values of the engine system 200; and the engine system 200 is controlled according to those operation amounts. As a result, not only the engine system 200 can be promptly controlled using the optimum operation amounts that are obtained using an AI model, but the optimum operation amounts can also be updated to appropriate values according to the operations and the state of the engine system 200.

As a result, the engine control device 100 becomes able to derive, at a fast rate, the solution of the optimization problem in which a combustion model for engines is used that is reproduced according to deep learning which is a kind of AI. As a result, it becomes possible to provide a sophisticated real-time-controller with respect to the engine system 200.

The engine operating conditions include the engine rotation count and the total fuel injection quantity.

As a result, the engine control device 100 becomes able to appropriately control an engine according to the solution of the optimization problem in which a combustion model for engines is used.

The operating amount includes the fuel injection quantity and the injection period during each stage of multiple injection.

As a result, the engine control device 100 becomes able to appropriately control an engine according to the solution of the optimization problem in which a combustion model for engines is used.

The AI model is a neural network, such as a DNN, an RNN, or an LSTM.

As a result, the engine control device 100 becomes able to derive, with a higher degree of accuracy and at a fast rate, the solution of the optimization problem in which a combustion model for engines is used.

The learning control table managing unit 107 optimizes an operation amount using the error between the control target value and the estimated value of the control value obtained by the AI model, and using the variation in the weighted operation amount.

As a result, the engine control device 100 becomes able to derive, with a higher degree of accuracy and at a fast rate, the solution of the optimization problem in which a combustion model for engines is used.

The learning control table is meant for reproducing the input-output responses of the inverse model of the AI model, and is rewritable in nature.

As a result, the engine control device 100 becomes able to derive, at a fast rate, the solution of the optimization problem in which a combustion model for engines is used.

The learning control table is meant for reproducing the input-output responses of the inverse model of the AI model that is configured by combining two-dimensional tables.

As a result, the engine control device 100 becomes able to derive, at a fast rate, the solution of the optimization problem in which a combustion model for engines is used.

The learning control tables include two types of tables, namely, the first-type learning control table that is configured with the control target values, the engine rotation count and the fuel injection quantity representing the engine driving conditions, and the operation amounts; and includes the second-type learning control table that is meant for correcting the difference between the operation amounts in the first-type learning control table and the second-type operation amounts calculated as a result of optimization.

As a result, the engine control device 100 becomes able to derive, at a fast rate, the solution of the optimization problem in which a combustion model for engines is used.

In the learning control table, one axis represents the engine rotation count and the fuel injection quantity representing the engine operating conditions, and the other axis represents the indexes of the combustion state of the engine.

As a result, the engine control device 100 becomes able to derive, at a fast rate, the solution of the optimization problem in which a combustion model for engines is used.

[b] Second Embodiment

Figure 8:
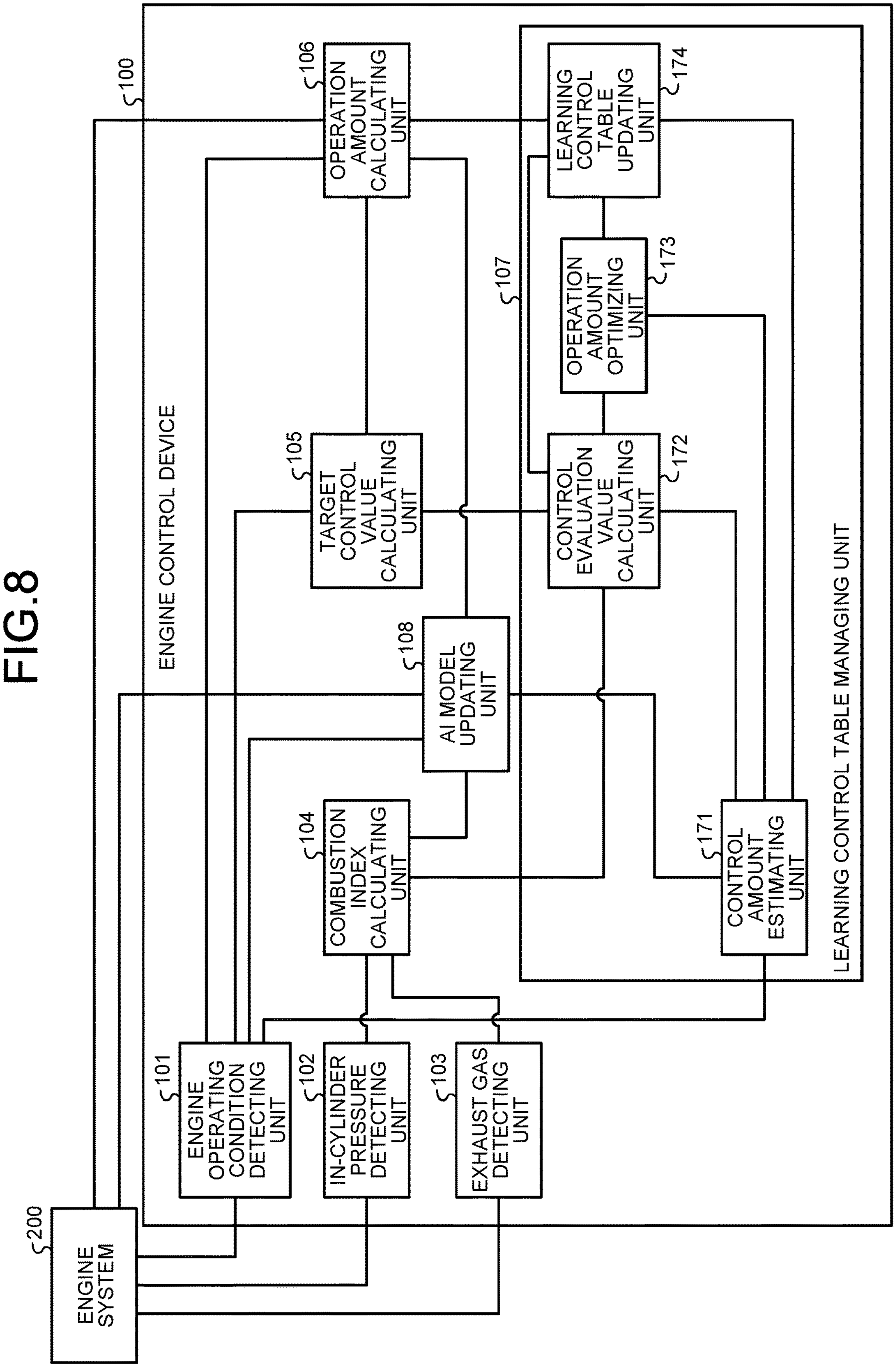
FIG. 8 is a block diagram of an engine control device according to a second embodiment.

FIG. 8 is a block diagram of an engine control device according to a second embodiment. As compared to the first embodiment, the engine control device 100 according to the second embodiment differs in the way that the AI model is updated from time to time. The following explanation is mainly given about the operation of updating the AI model, and the operations of the constituent elements identical to the first embodiment are not explained again. The engine control device 100 according to the second embodiment includes an AI model updating unit 108 in addition to including the constituent elements explained in the first embodiment.

The AI model updating unit 108 receives input of the engine operating conditions and the state quantities from the engine operating condition detecting unit 101. Moreover, the AI model updating unit 108 receives input of the operation amounts, which are obtained using the learning control table, from the operation amount calculating unit 106. Then, based on the engine operating conditions, the state quantities, and the operation amounts, the AI model updating unit 108 estimates the control amounts using the AI model. The control amounts represent one or more sets of information from among the indexes of the combustion state of the engine system 200, such as the thermal efficiency, the maximum pressure rise rate inside the cylinder, the torque, the combustion start position, and combustion gravity center, and the exhaust gases. Herein, the exhaust gases can be any one of or a combination of NOx, soot, CO, HC, and PM.

Then, the AI model updating unit 108 obtains the actual value of each control amount as calculated by the combustion index calculating unit 104. Subsequently, the AI model updating unit 108 determines whether or not the error between the estimated control amount and the obtained actual value of the control amount is equal to or greater than a predetermined threshold value. If the error between the estimated control amount and the obtained actual value of the control amount is equal to or greater than the threshold value, then the AI model updating unit 108 performs training of the weight coefficients and the bias of the AI model, which is provided in the control amount estimating unit 171, in such a way that the error between the estimated value of the control amount and the actual value of the control amount becomes smaller than the threshold value. Thus, the AI model updating unit 108 updates the AI model from time to time.

The control amount estimating unit 171 estimates the control amounts using the AI model that is updated from time to time by the AI model updating unit 108.

Flow of Operations

Figure 9:
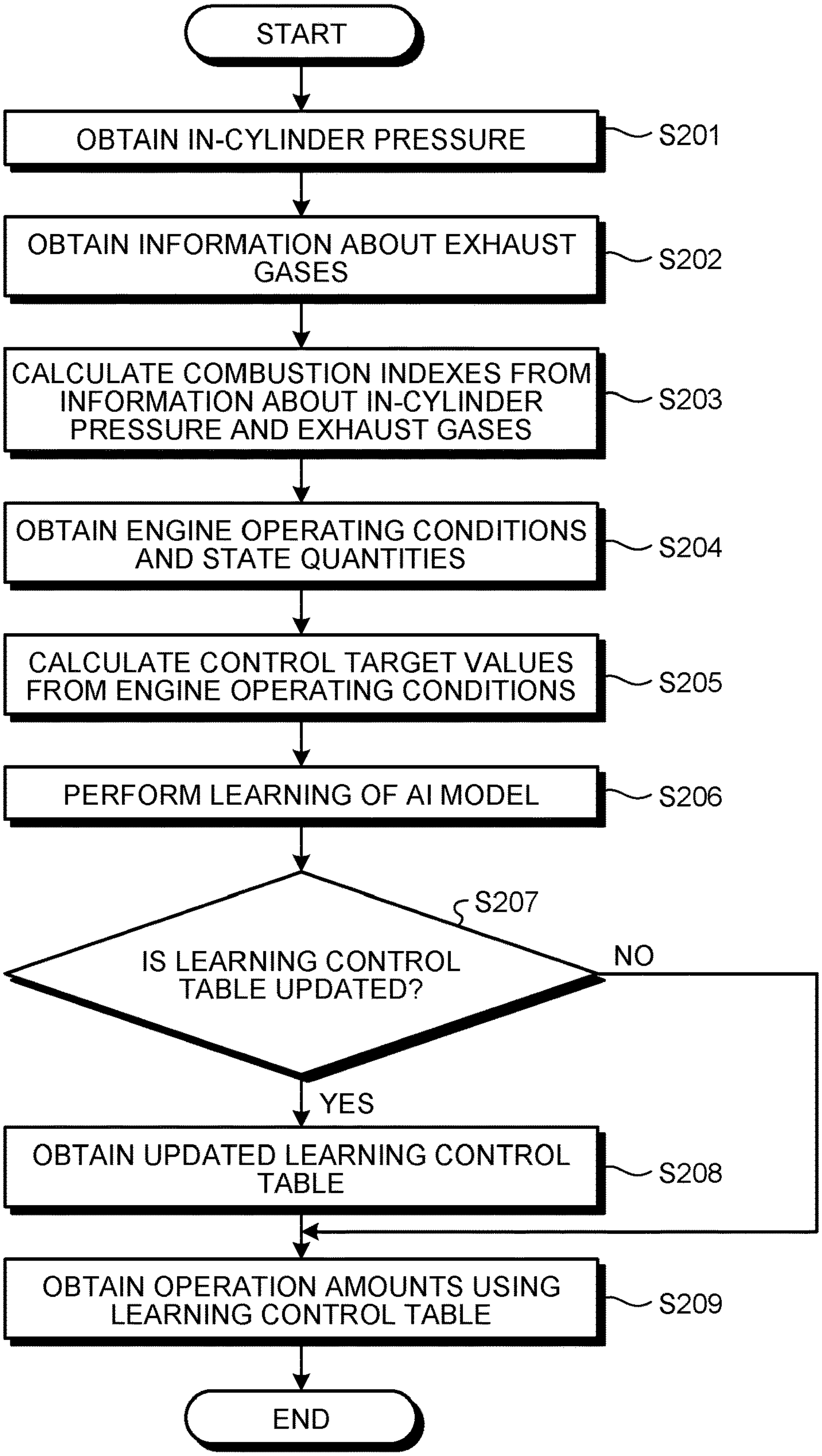
FIG. 9 is a flowchart for explaining a control operation with respect to the engine system as performed by the engine control device according to the second embodiment.

FIG. 9 is a flowchart for explaining a control operation with respect to the engine system as performed by the engine control device according to the second embodiment. Thus, explained below with reference to FIG. 9 is the flow of the control operation with respect to the engine system 200 as performed by the engine control device 100 according to the second embodiment.

The in-cylinder pressure detecting unit 102 obtains the information about the in-cylinder pressure detected by the in-cylinder pressure sensor installed in the engine system 200 (Step S201). Then, the in-cylinder pressure detecting unit 102 outputs the information about the detected in-cylinder pressure to the combustion index calculating unit 104.

The exhaust gas detecting unit 103 obtains the information about the exhaust gases detected by the exhaust gas sensor installed in the engine system 200 (Step S202). Then, the exhaust gas detecting unit 103 outputs the information about the exhaust gases to the combustion index calculating unit 104.

The combustion index calculating unit 104 calculates the combustion indexes of the engine system 200 using the information about the in-cylinder pressure as obtained from the in-cylinder pressure detecting unit 102 and using the information about the exhaust gases as obtained from the exhaust gas detecting unit 103 (Step S203). Then, the combustion index calculating unit 104 outputs the information about the calculated combustion indexes to the AI model updating unit 108.

The engine operating condition detecting unit 101 obtains, from the engine system 200, the engine operating conditions including the engine rotation count and the total combustion injection quantity. Moreover, the engine operating condition detecting unit 101 obtains, from the engine system 200, the state quantities including the air excess ratio, the fuel injection pressure, the intake manifold pressure, and the intake manifold oxygen concentration (Step S204). Then, the engine operating condition detecting unit 101 outputs the information about the engine operating conditions to the control target value calculating unit 105. Moreover, the engine operating condition detecting unit 101 outputs the information about the engine operating conditions and the state quantities to the AI model updating unit 108.

The control target value calculating unit 105 receives input of the information about the engine operating conditions from the engine operating condition detecting unit 101. Then, the control target value calculating unit 105 calculates the control target values from the engine operating conditions (Step S205). Subsequently, the control target value calculating unit 105 outputs the calculated control target values to the operation amount calculating unit 106.

The AI model updating unit 108 receives input of the engine operating conditions and the state quantities from the engine operating condition detecting unit 101. Moreover, the AI model updating unit 108 receives input of the operation amounts, which are obtained using the learning control table, from the operation amount calculating unit 106. Furthermore, the AI model updating unit 108 obtains the actual values of the control amounts as calculated by the combustion index calculating unit 104. Then, the AI model updating unit 108 performs training of the AI model that is held in the control amount estimating unit 171 (Step S206).

The learning control table updating unit 174 of the learning control table managing unit 107 determines whether or not the learning control table has been updated (Step S207). If the learning control table has not been updated (No at Step S207), then the system control of the engine system proceeds to Step S209.

On the other hand, if the learning control table has been updated (Yes at Step S207), then the learning control table updating unit 174 outputs the updated learning control table to the operation amount calculating unit 106. Thus, the operation amount calculating unit 106 obtains the updated learning control table (Step S208).

Subsequently, based on one or more items from among the engine operating conditions and the state quantities of the engine system 200 and based on the control target values, the operation amount calculating unit 106 obtains, using the learning control table, the operation amounts including the fuel injection quantity and the injection period at each stage of multiple injection, such as pre-injection, pilot injection, main injection, and after-injection (Step S209). Then, the operation amount calculating unit 106 notifies the engine system 200 about the obtained operation amounts, and controls the engine system 200 to operate according to the notified operation amounts.

Figure 10:
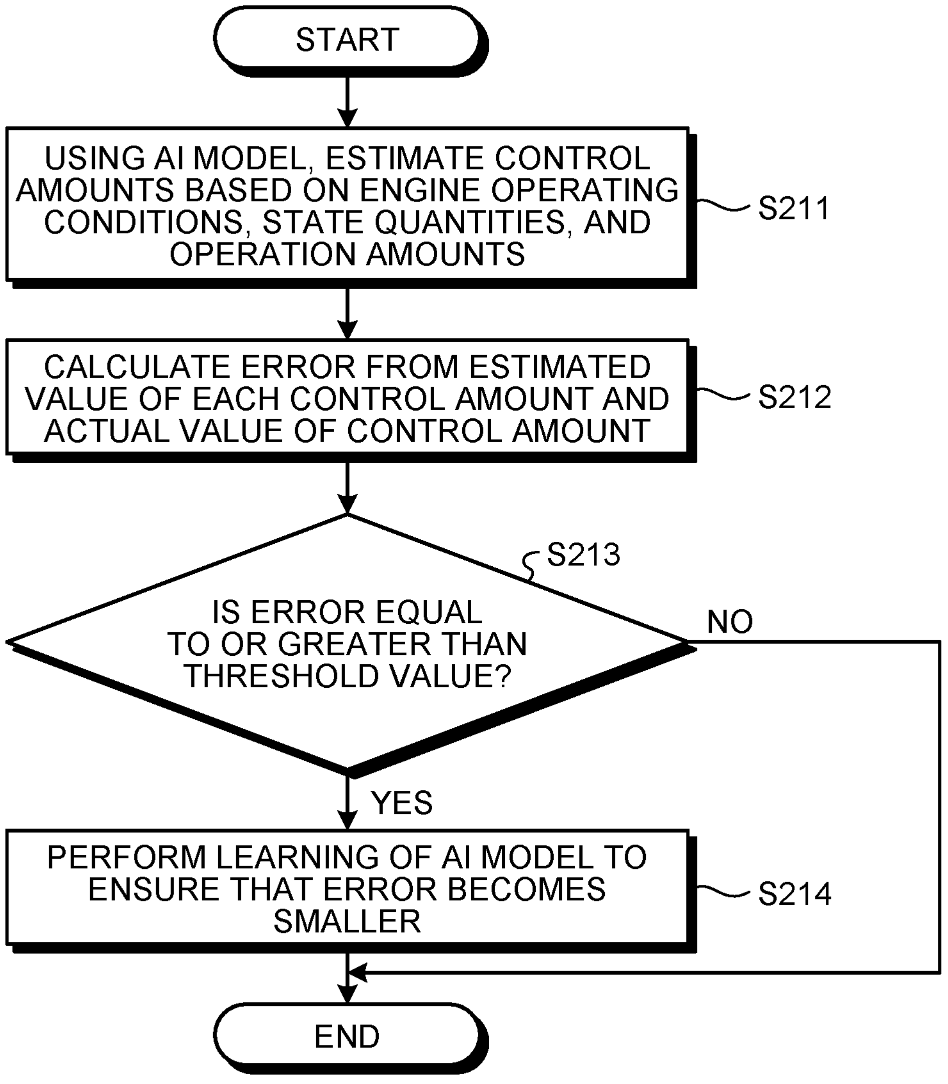
FIG. 10 is a flowchart for explaining a training operation with respect to the AI model as performed in the engine control device according to the second embodiment.

FIG. 10 is a flowchart for explaining a training operation with respect to the AI model as performed in the engine control device according to the second embodiment. Thus, explained below with reference to FIG. 10 is the flow of the training operation with respect to the AI model as performed in the engine control device 100 according to the second embodiment. The operations illustrated in the flowchart in FIG. 10 represent an example of the operation performed at Step S206 illustrated in FIG. 9.

The AI model updating unit 108 estimates the control amounts using the AI model and based on the engine operating conditions, the state quantities, and the operation amounts (Step S211).

Then, from the estimated value of each control amount and the actual value of the control amount, the AI model updating unit 108 calculates the error between the estimated value of the control amount and the actual value of the control amount (Step S212).

Subsequently, the AI model updating unit 108 determines whether or not the error between the estimated value of the control amount and the actual value of the control amount is equal to or greater than a threshold value (Step S213). If the error between the estimated value of the control amount and the actual value of the control amount is smaller than the threshold value (No at Step S213), then the AI model updating unit 108 ends the training operation with respect to the AI model.

On the other hand, if the error between the estimated value of the control amount and the actual value of the control amount is equal to or greater than the threshold value (Yes at Step S213), then the AI model updating unit 108 performs training of the weight coefficients and the bias of the AI model, which is provided in the control amount estimating unit 171, in such a way that the error between the estimated value of the control amount and the actual value of the control amount becomes smaller than the threshold value (Step S214).

As explained above, in the engine control device 100 according to the second embodiment, the AI model that is used in estimating the control amounts, which are meant for updating the learning control table, is updated from time to time. Moreover, the training of the AI model is carried out according to the secular changes or the environmental changes of the engine, and the weight coefficient and the bias of each neuron of the AI model is rewritten online.

As a result, the engine control device 100 becomes able to manage the learning control table using the AI model that is updated according to the state of the engine; and becomes able to derive, at a fast rate, the solution of the optimization problem in which a combustion model for engines is used. As a result, it becomes possible to provide a sophisticated real-time-controller with respect to the engine system 200.

[c] Third Embodiment

Figure 11:
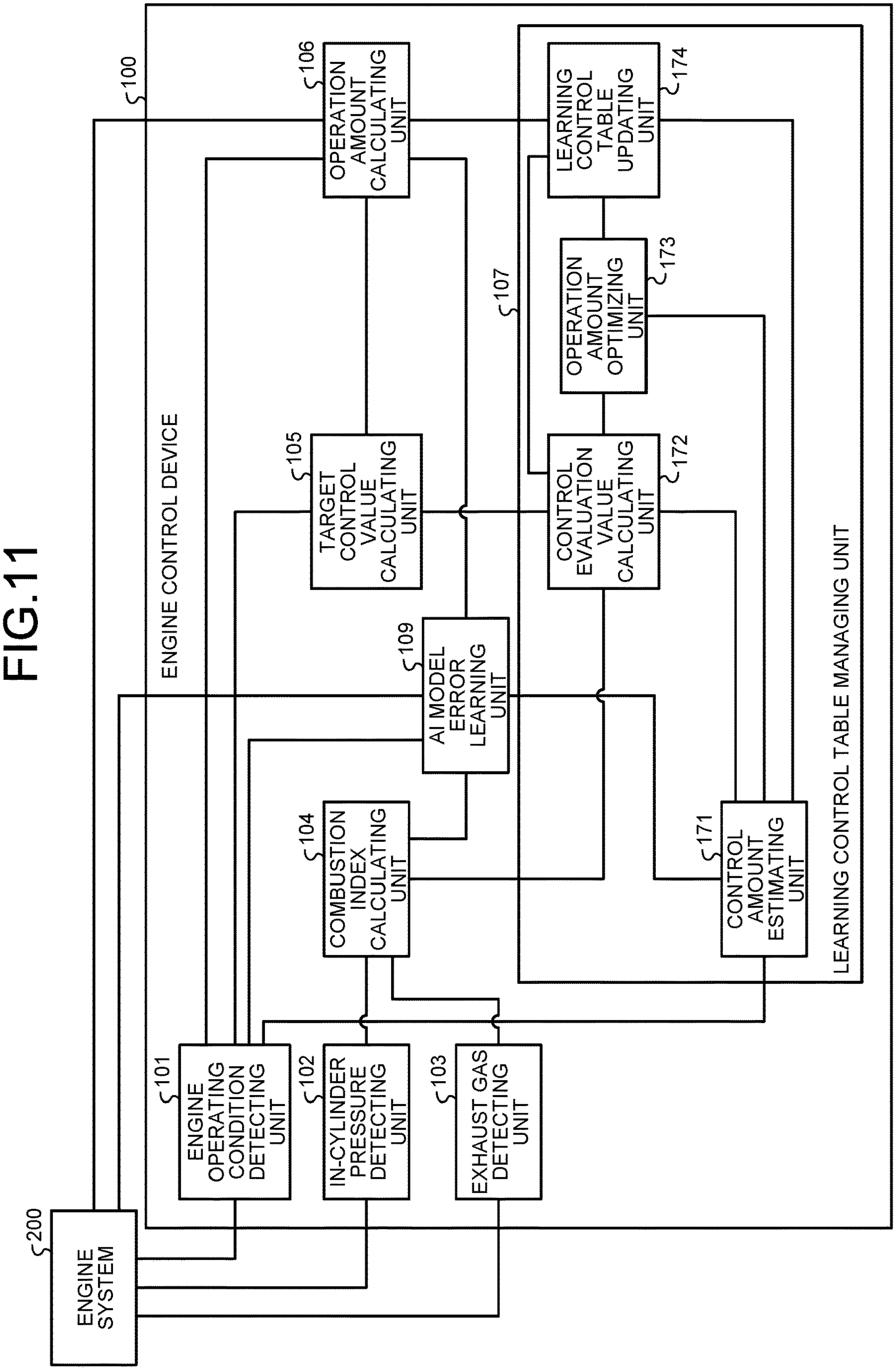
FIG. 11 is a block diagram of an engine control device according to a third embodiment.

FIG. 11 is a block diagram of an engine control device according to a third embodiment. As compared to the third embodiment, the engine control device 100 according to the third embodiment differs in the way that the control amount is obtained using the AI model as well as using an AI model error learning table meant for correcting the AI model; and that the learning of the AI model error learning table is done according to the actual values of the control amounts. The following explanation is mainly given about an estimation operation for estimating the control amounts using the AI model and the AI model error learning table, and about the learning operation of the AI model error learning table. Thus, the operations of the constituent elements identical to the first embodiment are not explained again. The engine control device 100 according to the third embodiment includes an AI model error learning unit 109 in addition to including the constituent elements explained in the first embodiment.

The control amount estimating unit 171 includes an AI model that receives input of the engine operating conditions, the state quantities, and the operation amounts; and that outputs the control amounts with respect to the input. Herein, the control amounts represent one or more sets of information from among the indexes of the combustion state of the engine system 200, such as the thermal efficiency, the maximum pressure rise rate inside the cylinder, the torque, the combustion start position, the combustion gravity center, and the exhaust gases. The exhaust gases can be any one of or a combination of NOx, soot, CO, HC, and PM. Meanwhile, the control amount estimating unit 171 also includes an AI model error learning table in which correction values are registered that are meant for correcting the error of the AI model and that correspond to the engine operating conditions.

The control amount estimating unit 171 estimates the control amount using the engine operating conditions, the state quantities, and the operation amounts obtained from the operation amount optimizing unit 173. Then, the control amount estimating unit 171 calculates the correction values of the control amounts from the engine operating conditions according to the AI model error learning table. At that time, for calculating the correction values, the control amount estimating unit 171 uses the AI model error learning table that is updated from time to time by the AI model error learning unit 109. Then, the control amount estimating unit 171 adds the estimated control amounts and the corresponding correction values, and calculates the final control amounts.

The AI model error learning unit 109 receives input of the engine operating conditions and the state quantities from the engine operation condition detecting unit 101. Moreover, the AI model error learning unit 109 receives input of the operation amounts, which are obtained using the learning control table, from the operation amount calculating unit 106. Then, the AI model error learning unit 109 estimates the control amounts using the engine operating conditions, the state quantities, and the operation amounts. Moreover, the AI model error learning unit 109 calculates, from the engine operating conditions, the correction value of each control amount according to the AI model error learning table. Then, the AI model error learning unit 109 adds the estimated control amount and the correction value, and calculates the final control amount.

Subsequently, the AI model error learning unit 109 obtains the actual value of the control amount as calculated by the combustion index calculating unit 104. Then, the AI model error learning unit 109 determines whether or not the error between the estimated value of the final control amount and the actual value of the obtained control amount is equal to or greater than a threshold value. If the error between the estimated value of the control amount and the actual value of the obtained control amount is equal to or greater than the threshold value, then the AI model error learning unit 109 performs learning of the AI model error learning table, which is included in the control amount estimating unit 171, in such a way that the error between the estimated value of the control amount and the actual value of the control amount is smaller than the threshold value. The AI model error learning unit 109 updates the AI model error learning table from time to time.

Flow of Operations

Figure 12:
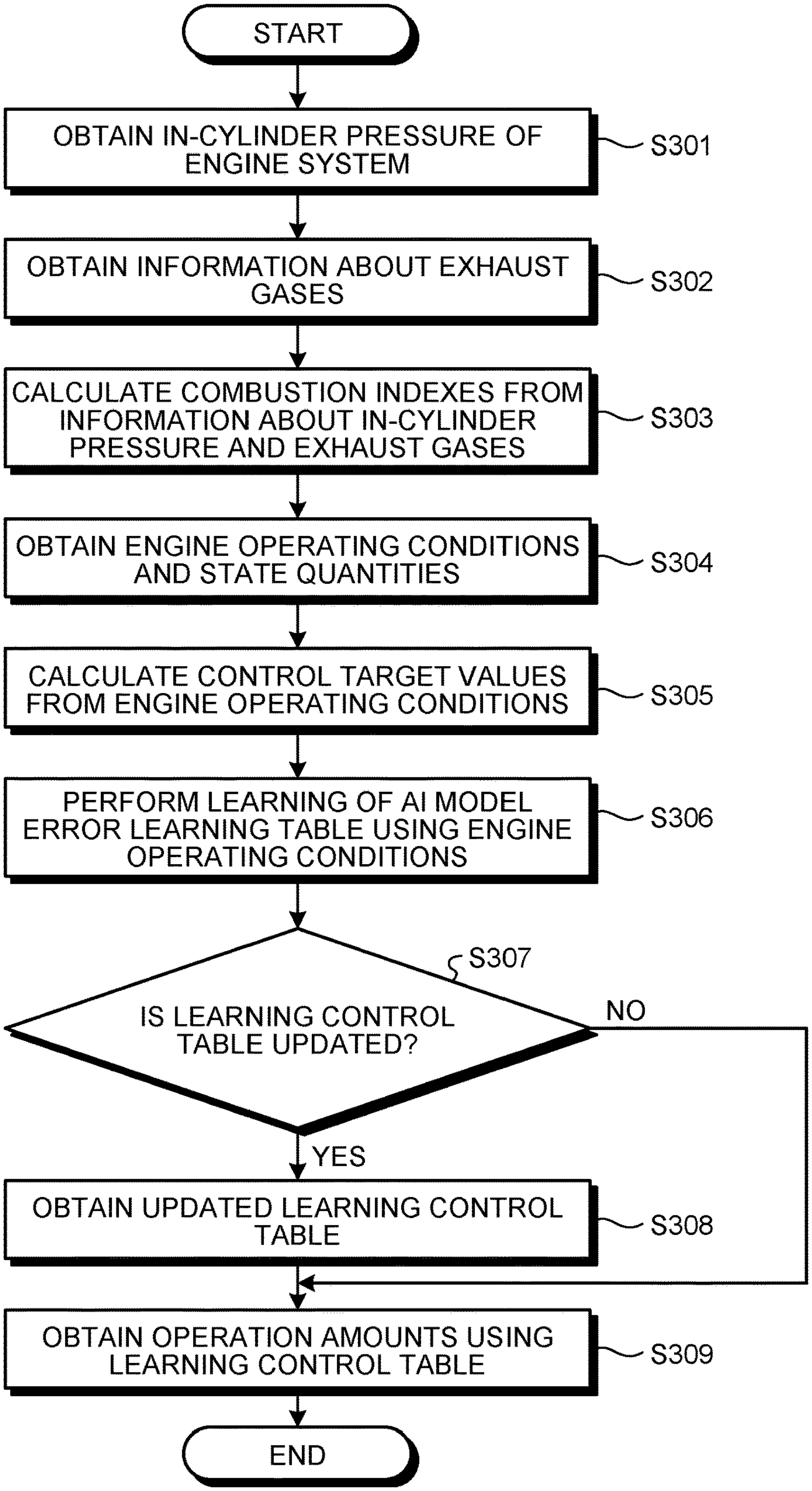
FIG. 12 is a flowchart for explaining a control operation with respect to the engine system as performed by the engine control device according to the third embodiment.

FIG. 12 is a flowchart for explaining a control operation with respect to the engine system as performed by the engine control device according to the third embodiment. Thus, explained below with reference to FIG. 12 is the flow of the control operation with respect to the engine system 200 as performed by the engine control device 100 according to the third embodiment.

The in-cylinder pressure detecting unit 102 obtains the information about the in-cylinder pressure detected by the in-cylinder pressure sensor installed in the engine system 200 (Step S301). Then, the in-cylinder pressure detecting unit 102 outputs the information about the detected in-cylinder pressure to the combustion index calculating unit 104.

The exhaust gas detecting unit 103 obtains the information about the exhaust gases detected by the exhaust gas sensor installed in the engine system 200 (Step S302). Then, the exhaust gas detecting unit 103 outputs the information about the exhaust gases to the combustion index calculating unit 104.

The combustion index calculating unit 104 calculates the combustion indexes of the engine system 200 using the information about the in-cylinder pressure as obtained from the in-cylinder pressure detecting unit 102 and using the information about the exhaust gases as obtained from the exhaust gas detecting unit 103 (Step S303). Then, the combustion index calculating unit 104 outputs the information about the calculated combustion indexes to the AI model updating unit 108.

The engine operating condition detecting unit 101 obtains, from the engine system 200, the engine operating conditions including the engine rotation count and the total combustion injection quantity. Moreover, the engine operating condition detecting unit 101 obtains, from the engine system 200, the state quantities including the air excess ratio, the fuel injection pressure, the intake manifold pressure, and the intake manifold oxygen concentration (Step S304). Then, the engine operating condition detecting unit 101 outputs the information about the engine operating conditions to the control target value calculating unit 105. Moreover, the engine operating condition detecting unit 101 outputs the information about the engine operating conditions and the state quantities to the AI model error learning unit 109.

The control target value calculating unit 105 receives input of the information about the engine operating conditions from the engine operating condition detecting unit 101. Then, the control target value calculating unit 105 calculates the control target values from the engine operating conditions (Step S305). Subsequently, the control target value calculating unit 105 outputs the calculated control target values to the operation amount calculating unit 106.

The AI model error learning unit 109 receives input of the engine operating conditions and the state quantities from the engine operating condition detecting unit 101. Moreover, the AI model error learning unit 109 receives input of the operation amounts, which are obtained using the learning control table, from the operation amount calculating unit 106. Furthermore, the AI model error learning unit 109 obtains the actual values of the control amounts as calculated by the combustion index calculating unit 104. Then, the AI model error learning unit 109 performs learning of the AI model error learning table held in the control amount estimating unit 171 (Step S306).

The learning control table updating unit 174 of the learning control table managing unit 107 determines whether or not the learning control table has been updated (Step S307). If the learning control table has not been updated (No at Step S307), then the system control of the engine system proceeds to Step S309.

On the other hand, if the learning control table has been updated (Yes at Step S307), then the learning control table updating unit 174 outputs the updated learning control table to the operation amount calculating unit 106. Thus, the operation amount calculating unit 106 obtains the updated learning control table (Step S308).

Subsequently, based on one or more items from among the engine operating conditions and the state quantities of the engine system 200 and based on the control target values, the operation amount calculating unit 106 obtains, using the learning control table, the operation amounts including the fuel injection quantity and the injection period at each stage of multiple injection, such as pre-injection, pilot injection, main injection, and after-injection (Step S309). Then, the operation amount calculating unit 106 notifies the engine system 200 about the obtained operation amounts, and controls the engine system 200 to operate according to the notified operation amounts.

Figure 13:
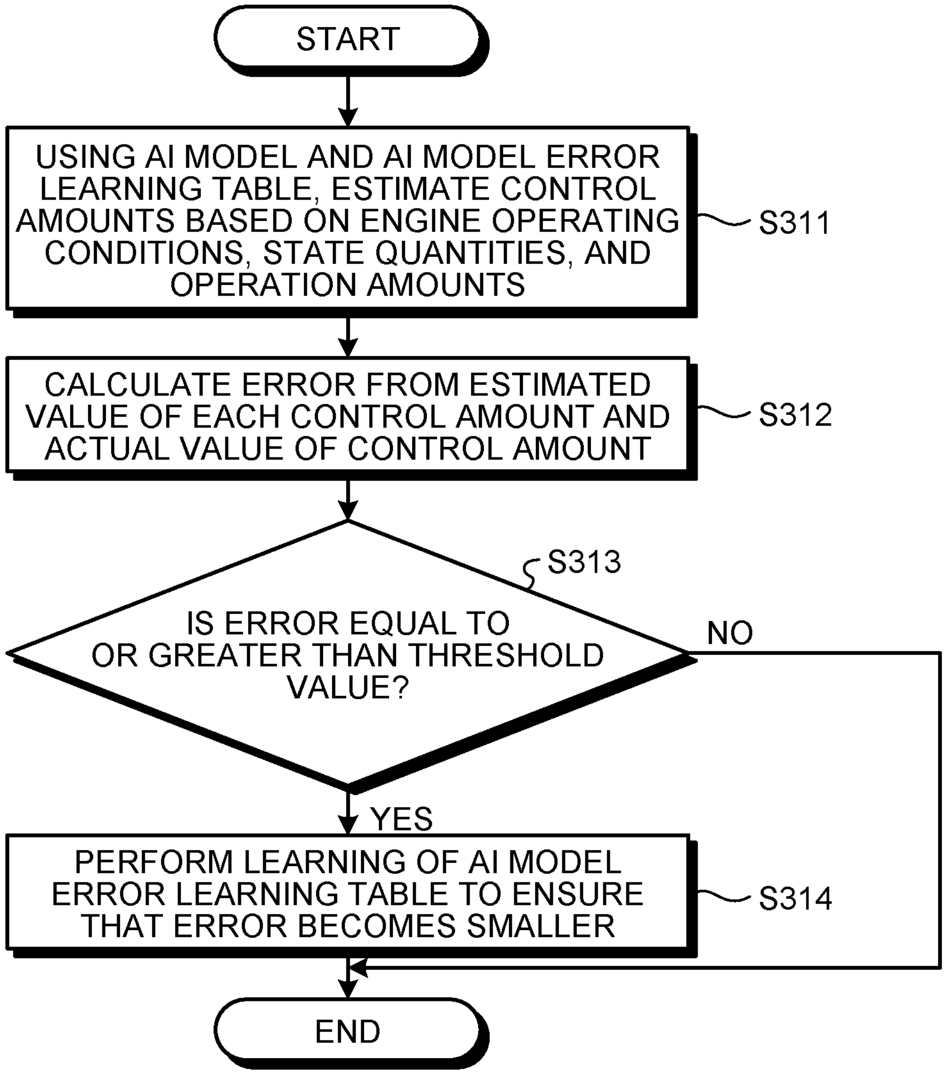
FIG. 13 is a flowchart for explaining a learning operation with respect to an AI model error learning table as performed by the engine control device according to the third embodiment.

FIG. 13 is a flowchart for explaining a learning operation with respect to the AI model error learning table as performed by the engine control device according to the third embodiment. Thus, explained below with reference to FIG. 13 is the flow of the learning operation with respect to the AI model error learning table as performed by the engine control device 100 according to the third embodiment. The operations illustrated in the flow in FIG. 13 represent an example of the operation performed at Step S306 illustrated in FIG. 12.

The AI model error learning unit 109 estimates the control amounts using the AI model as well as the AI model error learning table, and based on the engine operating conditions, the state quantities, and the operation amounts (Step S311).

Then, from the estimated value of each control amount and the actual value of the control amount, the AI model error learning unit 109 calculates the error between the estimated value of the control amount and the actual value of the control amount (Step S312).

Subsequently, the AI model error learning unit 109 determines whether or not the error between the estimated value of the control amount and the actual value of the control amount is equal to or greater than a threshold value (Step S313). If the error between the estimated value of the control amount and the actual value of the control amount is smaller than the threshold value (No at Step S313), then the AI model error learning unit 109 ends the learning operation with respect to the AI model error learning table.

On the other hand, if the error between the estimated value of the control amount and the actual value of the control amount is equal to or greater than the threshold value (Yes at Step S313), then the AI model error learning unit 109 performs learning of the AI model error learning table, which is included in the control amount estimating unit 171, in such a way that the error between the estimated value of the control amount and the actual value of the control amount becomes smaller than the threshold value (Step S314).

Figure 14:
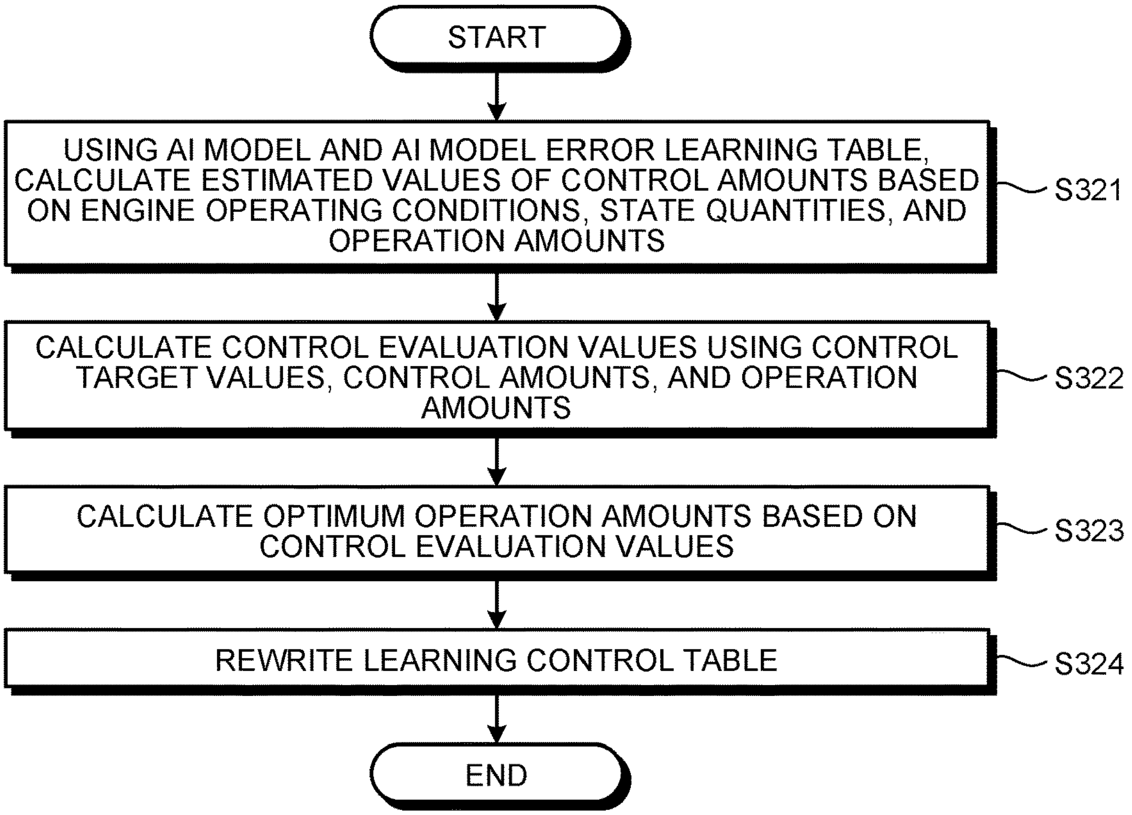
FIG. 14 is a flowchart for explaining an updating operation with respect to the learning control table as performed in the engine control device according to the third embodiment.

FIG. 14 is a flowchart for explaining an updating operation with respect to the learning control table as performed in the engine control device according to the third embodiment. Thus, explained below with reference to FIG. 14 is the flow of the updating operation with respect to the learning control table as performed in the engine control device 100 according to the third embodiment.

The control amount estimating unit 171 obtains the engine operating conditions and the state quantities of the engine system 200 from the engine operating condition detecting unit 101. Moreover, from the operation amount optimizing unit 173, the control amount estimating unit 171 obtains the first-type operation amount being subjected to optimization calculation. Then, the control amount estimating unit 171 inputs the engine operating conditions and the state quantities of the engine system 200 and inputs the first-type operation amount of the operation amount optimizing unit 173 to the AI model held therein, and estimates the control amounts. Subsequently, the control amount estimating unit 171 calculates the correction value of each control amount from the engine operating conditions according to the AI model error learning table. Then, the control amount estimating unit 171 adds the estimated control amount and the correction value, and calculates the estimated value of the final control amount (Step S321). Subsequently, the control amount estimating unit 171 outputs the estimated value of the final control amount to the control evaluation value calculating unit 172. Moreover, the control amount estimating unit 171 outputs, to the learning control table updating unit 174, the information about the engine operating conditions and the state quantities of the engine system 200 that were used in estimating the control amount.

The control evaluation value calculating unit 172 obtains the control target values from the control target value calculating unit 105. Moreover, the control evaluation value calculating unit 172 obtains the estimated value of the control amount from the control amount estimating unit 171. Furthermore, the control evaluation value calculating unit 172 obtains the first-type operation amount from the operation amount optimizing unit 173. Moreover, the control evaluation value calculating unit 172 obtains the engine combustion index generated by the combustion index calculating unit 104. Furthermore, the control evaluation value calculating unit 172 obtains the actual value of each control amount from the engine combustion index. Then, the control evaluation value calculating unit 172 calculates the control amount by considering the actual value of the control amount along with the estimated control amount and by taking into account the drift. Subsequently, the control evaluation value calculating unit 172 calculates the control evaluation value using the error between the control target value and the control amount and using the value obtained by weighting the variation in the operation amount (Step S322). Subsequently, the control evaluation value calculating unit 172 outputs the calculated control evaluation value to the operation amount optimizing unit 173. Moreover, the control evaluation value calculating unit 172 outputs the control target value, which was used in calculating the control evaluation value, to the learning control table updating unit 174.

The operation amount optimizing unit 173 receives input of the control evaluation value from the control evaluation value calculating unit 172. Then, the operation amount optimizing unit 173 calculates the operation amount for which the control evaluation value is the smallest (Step S323). Subsequently, the operation amount optimizing unit 173 outputs the calculated operation amount as the first-type operation amount to the control amount estimating unit 171. Moreover, at the time of ending the optimization calculation when the control evaluation value is the smallest or when a predetermined number of iterations are completed, the operation amount optimizing unit 173 treats the calculated operation amount as a second-type operation amount, and outputs it as the optimum operation amount to the learning control table updating unit 174.

The learning control table updating unit 174 receives input of the optimum operation amounts from the operation amount optimizing unit 173. Moreover, the learning control table updating unit 174 receives input of the engine operating conditions and the state quantities of the engine system 200 from the control amount estimating unit 171. Furthermore, the learning control table updating unit 174 receives input of the control target values from the control evaluation value calculating unit 172. Subsequently, the learning control table updating unit 174 associates the combinations of the control target values, the engine operating conditions, and the state quantities with the corresponding optimum operation amounts. Then, the learning control table updating unit 174 rewrites the learning control table using the combinations of the control target values, the engine operating conditions, and the state quantities and using the corresponding optimum operation amounts (Step S324).

As explained above, the engine control device 100 according to the third embodiment updates, from time to time, the AI model error learning table that is meant for correcting the control amounts, which are to be used in updating the learning control table estimated by the AI model, in accordance with the state of the engine system 200.

As a result, in the engine control device 100, the learning control table can be managed using the AI model error learning table which is updated according to the state of the engine. Hence, the solution of the optimization problem in which a combustion model for engines is used can be derived in a more appropriate manner. Thus, the engine control device 100 becomes able to provide a sophisticated real-time-controller with respect to the engine system 200.

System

The processing procedures, the control procedures, specific names, various data, and information including parameters described in the embodiments or illustrated in the drawings can be changed as required unless otherwise specified. Moreover, the specific examples, the distributions, and the numerical values given in the embodiments are only exemplary, and can be changed in an arbitrary manner.

Meanwhile, regarding the separation or the integration of the constituent elements of the devices, the specific form is not limited to the illustration given in the drawings. For example, other than the learning control table managing unit 107, the other function units of the engine control device 100 can be disposed in different devices. That is, the constituent elements, as a whole or in part, can be separated or integrated either functionally or physically based on various types of loads or use conditions. The process functions implemented in the device are entirely or partially implemented by a CPU or by computer programs that are analyzed and executed by a CPU, or are implemented as hardware by wired logic.

Hardware

Figure 15:
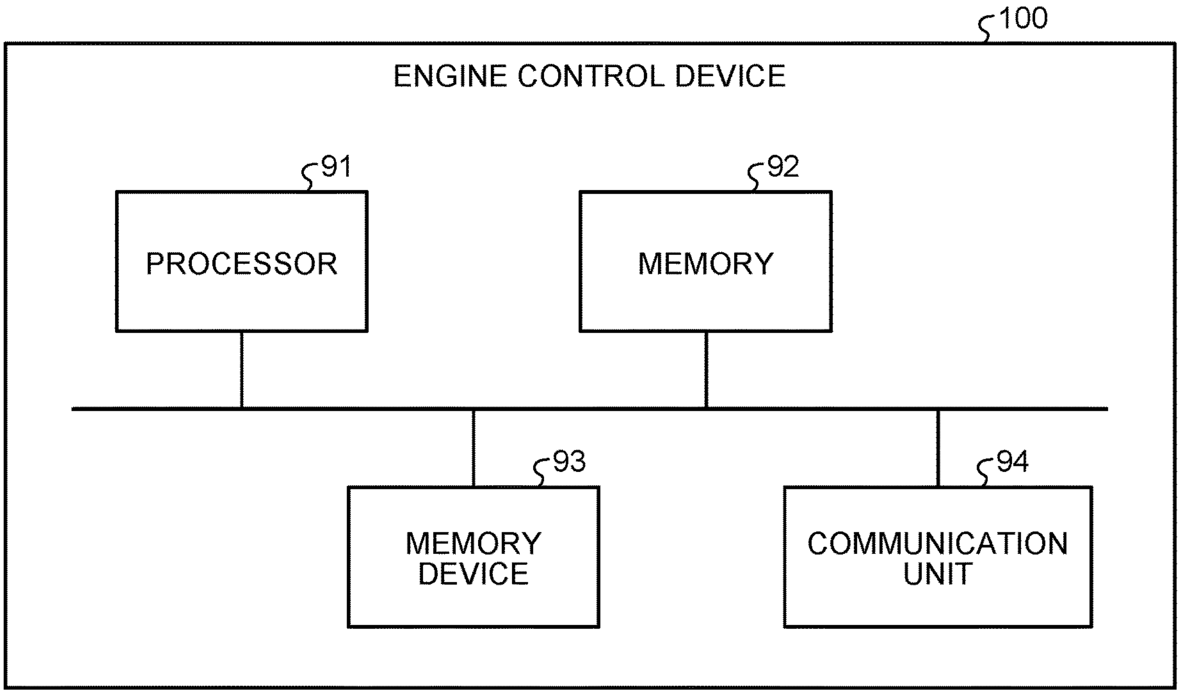
FIG. 15 is a diagram illustrating an exemplary hardware configuration of the engine control device.

FIG. 15 is a diagram illustrating an exemplary hardware configuration of the engine control device. As illustrated in FIG. 15, the engine control device 100 includes a processor 91, a memory 92, a memory device 93, and a communication unit 94. Moreover, the constituent elements illustrated in FIG. 15 are connected to each other by a bus.

The communication unit 94 is a network interface card that performs communication with other information processing devices. The memory device 93 is used to store a computer program meant for implementing the functions of the engine control device 100 illustrated in FIGS. 1, 8, and 11; and to store data.

The processor 91 reads, from the memory device 93, the computer program meant for implementing the functions of the engine control device 100 illustrated in FIGS. 1, 8, and 11. Then, the processor 91 loads the computer program in the memory 92, and executes processes for implementing the functions of the engine control device 100 illustrated in FIGS. 1, 8, and 11.

Alternatively, the engine control device 100 can read the computer program, which is meant for implementing the functions of the engine control device 100 illustrated in FIGS. 1, 8, and 11, from a recording medium using a medium reading device; and can execute the computer program to implement the functions. Meanwhile, the computer program is not limited to be executed by the engine control device 100. For example, even when the computer program is executed by some other information processing device or when the computer program is executed in cooperation among devices, the present invention can still be implemented in an identical manner.

The computer program, which is meant for implementing the functions of the engine control device 100 illustrated in FIGS. 1, 8, and 11, can be distributed via a network such as the Internet. Alternatively, the computer program can be recorded in a computer-readable recording medium such as a hard disk drive (HDD), a solid state drive (SSD), a flexible disk (FD), a compact disc read only memory (CD-ROM), a magneto-optical (MO) disk, or a digital versatile disc (DVD). Then, a computer can read the computer program from the recording medium, and execute it.

According to an aspect, the present invention enables deriving, at a fast rate, the solution of the optimization problem in which a combustion model for engines is used that is reproduced according to deep learning which is a kind of AI.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An engine control device including:
- a model that, based on an engine operating condition and a first-type operation amount, reproduces at least one index from among indexes of combustion states of an engine, the indexes consisting of thermal efficiency, maximum pressure rise rate inside cylinder, torque, combustion start position, combustion gravity center, NOx, soot, CO, HC, and PM; and
- a processor that executes a process including
  - deciding on a second-type operation amount, by optimization using the model so as to
    - treat at least one of the indexes, which are reproduced by the model, as an estimated value of a control amount, and
    - ensure that the estimated value of the control amount follows a control target value,
  - rewriting a learning control table so that in the learning control table the second-type operation amount associated with the control target value and the engine operating condition is registered, and
  - obtaining the second-type operation amount according to the learning control table based on the control target value and the engine operating condition, the second-type operation amount being used to operate the engine, wherein
- each of the first-type operation amount and the second-type operation amount includes fuel injection quantity and inject period during multiple injection, and
- the learning control table includes two types of tables including
  - a first-type learning control table that is formed with the control target value,
    - engine rotation count and fuel injection quantity representing the engine operating condition, and
    - the first-type operation amount, and
  - a second-type learning control table for correcting a difference between the first-type operation amount specified in the first-type learning control table and the second-type operation amount calculated as a result of the optimization.

2. The engine control device according to claim 1, wherein the engine operating condition includes engine rotation count and total fuel injection quantity.

3. The engine control device according to claim 1, wherein the model is one of a type of neural networks including a deep neural network (DNN), a recurrent neural network (RNN), and a long short term memory (LSTM).

4. The engine control device according to claim 1, wherein the process further includes performing the optimization using an error between the control target value and the estimated value of the control amount as obtained by the model, and using a control evaluation value obtained by weighting the first-type operation amount.

5. The engine control device according to claim 1, wherein
- training of the model is carried out according to secular changes or environmental changes of the engine, and
- a weight coefficient and bias of the model are rewritten online.

6. The engine control device according to claim 1, wherein the learning control table is a table for reproducing an input-output response of an inverse model of the model, and is rewritable in nature.

7. The engine control device according to claim 6, wherein, in the learning control table,
- one axis represents the engine operating condition, and
- an other axis represents an index of combustion state of the engine.

8. The engine control device according to claim 1, wherein the learning control table is a table for reproducing an input-output response of an inverse model of the model, and is configured using a combination of two-dimensional tables.

9. An engine control method including:
- holding a model that, based on an engine operating condition and a first-type operation amount, reproduces at least one index from among indexes of combustion states of an engine, the indexes consisting of thermal efficiency, maximum pressure rise rate inside cylinder, torque, combustion start position, combustion gravity center, NOx, soot, CO, HC, and PM;
- deciding on a second-type operation amount, by optimization using the model so as to
  - treat at least one of the indexes, which are reproduced by the model, as an estimated value of a control amount, and
  - ensure that the estimated value of the control amount follows a control target value;
- rewriting a learning control table so that in the learning control table the second-type operation amount associated with the control target value and the engine operating condition is registered; and obtaining, based on the control target value and the engine operating condition, the second-type operation amount according to the learning control table, the second-type operation amount being used to operate the engine, by a processor, wherein each of the first-type operation amount and the second-type operation amount includes fuel injection quantity and inject period during multiple injection, and the learning control table includes two types of tables including a first-type learning control table that is formed with the control target value, engine rotation count and fuel injection quantity representing the engine operating condition, and the first-type operation amount, and a second-type learning control table for correcting a difference between the first-type operation amount specified in the first-type learning control table and the second-type operation amount calculated as a result of the optimization.

10. The engine control method according to claim 9, wherein the engine operating condition includes engine rotation count and total fuel injection quantity.

11. The engine control method according to claim 9, wherein the model is one of a type of neural networks including a deep neural network (DNN), a recurrent neural network (RNN), and a long short term memory (LSTM).

12. The engine control method according to claim 9, wherein the process further includes performing the optimization using an error between the control target value and the estimated value of the control amount as obtained by the model, and using a control evaluation value obtained by weighting the first-type operation amount.

13. The engine control method according to claim 9, wherein training of the model is carried out according to secular changes or environmental changes of the engine, and a weight coefficient and bias of the model are rewritten online.

14. The engine control method according to claim 9, wherein the learning control table is a table for reproducing an input-output response of an inverse model of the model, and is rewritable in nature.

15. The engine control method according to claim 14, wherein, in the learning control table, one axis represents the engine operating condition, and an other axis represents an index of combustion state of the engine.

16. The engine control method according to claim 9, wherein the learning control table is a table for reproducing an input-output response of an inverse model of the model, and is configured using a combination of two-dimensional tables.

* * * * *